(12) United States Patent
Kito et al.

(10) Patent No.: US 9,493,642 B2
(45) Date of Patent: *Nov. 15, 2016

(54) THERMOPLASTIC RESIN COMPOSITION, METHOD FOR PRODUCING SAME, AND MOLDED BODY

(71) Applicants: TOYOTA BOSHOKU KABUSHIKI KAISHA, Aichi (JP); KABUSHIKI KAISHA TOYOTA CHUO KENKYUSHO, Aichi (JP)

(72) Inventors: Masayuki Kito, Aichi (JP); Toshiyuki Ario, Aichi (JP); Jumpei Kawada, Aichi (JP); Makoto Mouri, Aichi (JP); Osamu Watanabe, Aichi (JP); Makoto Kato, Aichi (JP); Hirotaka Okamoto, Aichi (JP)

(73) Assignees: TOYOTA BOSHOKU KABUSHIKI KAISHA, Aichi (JP); KABUSHIKI KAISHA TOYOTA CHUO KENKYUSHO, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/366,894

(22) PCT Filed: Dec. 21, 2012

(86) PCT No.: PCT/JP2012/083368
§ 371 (c)(1),
(2) Date: Jun. 19, 2014

(87) PCT Pub. No.: WO2013/094763
PCT Pub. Date: Jun. 27, 2013

(65) Prior Publication Data
US 2014/0371394 A1    Dec. 18, 2014

(30) Foreign Application Priority Data

Dec. 22, 2011 (JP) .................. 2011-282232
Dec. 22, 2011 (JP) .................. 2011-282233
Dec. 21, 2012 (JP) .................. 2012-280269
Dec. 21, 2012 (JP) .................. 2012-280270

(51) Int. Cl.
| | | |
|---|---|---|
| C08L 23/00 | (2006.01) | |
| C08L 77/00 | (2006.01) | |
| C08L 23/12 | (2006.01) | |
| C08L 23/10 | (2006.01) | |
| C08L 77/02 | (2006.01) | |
| C08L 77/06 | (2006.01) | |
| C08J 3/00 | (2006.01) | |

(52) U.S. Cl.
CPC .............. *C08L 23/12* (2013.01); *C08J 3/005* (2013.01); *C08L 23/10* (2013.01); *C08L 77/02* (2013.01); *C08L 77/06* (2013.01); *C08J 2323/12* (2013.01); *C08J 2377/06* (2013.01); *C08J 2415/00* (2013.01); *C08J 2423/12* (2013.01); *C08J 2423/20* (2013.01); *C08J 2425/08* (2013.01); *C08L 2205/03* (2013.01); *C08L 2205/08* (2013.01)

(58) Field of Classification Search
None
See application file for complete search history.

(56) References Cited

U.S. PATENT DOCUMENTS

| 4,795,782 A | 1/1989 | Lutz et al. |
| 2006/0122326 A1 | 6/2006 | Okamoto et al. |
| 2006/0185750 A1* | 8/2006 | Mestemacher ............... 138/137 |

FOREIGN PATENT DOCUMENTS

| CN | 1708548 | 12/2005 |
| EP | 0 261 748 | 3/1988 |
| EP | 0 472 344 | 2/1992 |
| EP | 1 672 030 | 6/2006 |
| JP | 63-89550 | 4/1988 |
| JP | 04-096957 | 3/1992 |
| JP | 04-96969 | 3/1992 |
| JP | 04-164960 | 6/1992 |
| JP | 04-183733 | 6/1992 |
| JP | 04-202247 | 7/1992 |
| JP | 07-216149 | 8/1995 |
| JP | 08-169987 | 7/1996 |
| JP | 08-176354 | 7/1996 |
| JP | 2006-307132 | 11/2006 |
| JP | 2007-297441 | 11/2007 |
| JP | 2008-214585 | 9/2008 |
| JP | 2009-074081 | 4/2009 |

(Continued)

OTHER PUBLICATIONS

International Search Report for PCT/JP2012/083368, mailed Apr. 2, 2013; along with an English translation.

(Continued)

*Primary Examiner* — Ana Woodward
(74) *Attorney, Agent, or Firm* — Greenblum & Bernstein, P.L.C.

(57) ABSTRACT

A thermoplastic resin composition contains a polyamide resin that is dispersed therein, is characterized in that the thermoplastic resin composition is obtained by melting and kneading a polyolefin resin and a mixed resin obtained by melting and kneading a polyamide resin and a compatibilizer; and the compatibilizer is a modified elastomer that is obtained by providing an elastomer (such as an olefin-based thermoplastic elastomer or a styrene-based thermoplastic elastomer) with a reactive group that is reactive with the polyamide resin. Also, a thermoplastic resin composition is obtained by melting and kneading from 1% by mass to 80% by mass (inclusive) of a plant-derived polyamide resin such as polyamide 11, from 5% by mass to 75% by mass (inclusive) of a polyolefin resin and from 1% by mass to 30% by mass (inclusive) of a compatibilizer that is an olefin-based thermoplastic elastomer that is modified with an acid.

13 Claims, 2 Drawing Sheets

(56) References Cited

FOREIGN PATENT DOCUMENTS

| JP | 2009-074082 | 4/2009 |
|---|---|---|
| JP | 2009-126916 | 6/2009 |
| JP | 2009-203410 | 9/2009 |
| JP | 2009-209227 | 9/2009 |
| JP | 2010-018694 | 1/2010 |
| JP | 2010-265444 | 11/2010 |
| WO | 2004/039882 | 5/2004 |

OTHER PUBLICATIONS

Written Opinion for PCT/ JP2012/083368, mailed on Apr. 2, 2013; along with an English translation.
Japanese Office Action for Application No. 2012-280270, dated Mar. 18, 2015 along with an English translation thereof.
CAS, "Common Chemistry—Substance Details—25087-34-7: 1-Butene, polymer with ethene", published May 11, 2015, retrieved from http://www.commonchemistry.org/ChemicalDetail.aspx?ref=25087-34-7 on May 12, 2015.
Extended European Search Report for Application No. EP 12 86 0507, mailed Jun. 2, 2015.
Office Action issued in Japan Counterpart Patent Appl. No. 2012-280269, dated Aug. 11, 2015, along with an english translation thereof.
Office Action for counterpart Chinese Application No. 201280062751.5, which was issued on Aug. 6, 2015; along with an English translation thereof.
Korean Office Action issued with respect to application No. 10-2014-7019338, mail date is Feb. 22, 2016.
Chinese Office Action issued with respect to application No. 201280062751.5, mail date is Apr. 5, 2016.

* cited by examiner

THERMOPLASTIC RESIN COMPOSITION, METHOD FOR PRODUCING SAME, AND MOLDED BODY

FIELD OF THE INVENTION

The present invention relates to a thermoplastic resin composition and a production method thereof, and a molded article. More specifically, the invention relates to a thermoplastic resin composition that is excellent in impact strength as well as rigidity, and to a production method thereof. The present invention also relates to a plant-derived polyamide resin containing thermoplastic resin composition that is excellent in impact strength as well as rigidity, and to a molded article.

BACKGROUND ART

A polymer blend (including a polymer alloy) that is produced by mixing resins which differ in polarity to modify the properties of the resins is extensively studied (see Patent Literatures 1 and 2, for example).

When the compatibility of the resins is insufficient, a deterioration in mechanical properties (e.g., impact strength) may occur, and the modification effects due to the polymer blend may not be obtained. Therefore, it is necessary to improve the compatibility of the resins using some kind of method. For example, in the case of producing a polymer alloy of a polypropylene resin and a polyamide resin, a method that utilizes a compatibilizer (e.g., anhydrous maleic acid-modified polypropylene) is proposed to improve compatibility.

Interior automotive components and exterior automotive components require high mechanical properties, and indispensably need compatibility between impact strength and rigidity (flexural modulus).

However, in the above-described polymer blends, impact strength and rigidity are in a trade-off relation. In particular, since they are in a reciprocal relation in which when impact strength is emphasized, rigidity becomes insufficient, a polymer blend that exhibits both sufficient impact strength and sufficient rigidity has not been obtained yet.

Conventionally, polylactic acid (PLA), polybutylene succinate (PBS), polytrimethylene terephthalate (PTT), polyamide 11 (PA11), and the like are known as a plant-derived resin used for a plant-derived plastic material. An alloyed plant-derived plastic material is known that is produced by blending a petroleum-derived resin (e.g., polyolefin resin or ABS) with a plant-derived resin. For example, Patent Literatures 3 and 4 describe an example of an alloyed plant-derived plastic material that utilizes PLA. Patent Literatures 5 and 6 describe an example of an alloyed plant-derived plastic material that utilizes PBS. Further, Patent Literature 7 describes an example of an alloyed plant-derived plastic material that utilizes PAH.

However, a plant-derived plastic material that utilizes PLA, PBS, or PTT has a problem in that the properties of the plant-derived resin may remain unchanged (in particular, sufficient mechanical properties may not be obtained). For example, impact strength, heat resistance, and hydrolyzability may not be sufficiently achieved when using PLA, rigidity, heat resistance, and hydrolyzability may not be sufficiently achieved when using PBS, and impact strength and hydrolyzability may not be sufficiently achieved when using PTT. Therefore, use of a plant-derived resin (plant-derived plastic material) is limited (e.g., it is difficult to apply a plant-derived resin (plant-derived plastic material) as an automotive interior material to parts (e.g., door trim or deck side trim) for which particularly high mechanical properties are required). In the case of using a plant-derived resin as a base material, it is necessary to modify the resin, and an increase in cost may occur. A thermoplastic resin composition that utilizes PA11, disclosed in Patent Literature 5 has a problem in that an ABS resin (inexpensive general-purpose plastic) that is used in combination with PA11 is expensive as compared with an olefin-based resin (e.g., polypropylene), and has insufficient solvent resistance since it is an amorphous resin.

High mechanical properties are required in automobile field including interior parts and exterior parts, and it is indispensable to achieve impact strength and rigidity (flexural modulus) in combination.

However, in the above-described polymer blends, impact strength and rigidity are in a trade-off relation. In particular, since they are in a reciprocal relation in which when impact strength is emphasized, rigidity becomes insufficient, both of impact strength and rigidity have not been fully satisfied so far.

PRIOR ART LITERATURE

Patent Literature

Patent Literature 1: JP A 2007-297441
Patent Literature 2: JP A 2009-203410
Patent Literature 3: JP A 2009-126916
Patent Literature 4: JP A 2010-265444
Patent Literature 5: JP A 2010-18694
Patent Literature 6: JP A 2009-209227
Patent Literature 7: JP A 2008-214585

SUMMARY OF THE INVENTION

Problems that the Invention is to Solve

The invention was conceived in view of the above situation. An object of the present invention is to provide a thermoplastic resin composition that is excellent in impact strength as well as rigidity, and a production method thereof.

The invention was conceived in view of the above situation. An object of the present invention is to provide a thermoplastic resin composition utilizing a plant-derivative polyamide resin that is excellent in rigidity as well as impact strength, and a molded article.

Means for Solving Problems

The invention as described in claim 1 in order to solve the above problems is a thermoplastic resin composition in which a polyamide resin is dispersed in a polyolefin resin and is characterized in that the thermoplastic resin composition is obtained by molten blending the polyolefin resin, and a mixed resin which is obtained by molten blending the polyamide resin and a compatibilizer, and that the compatibilizer is a modified elastomer in which a reactive group which reacts with the polyamide resin is substituted to an elastomer.

The invention as described in claim 2 is a thermoplastic resin composition in which the elastomer is a styrene-based thermoplastic elastomer, or an olefin-based thermoplastic elastomer consisting of a polymer of an α-olefin having carbon atoms of 3 to 8 and ethylene or propylene in the description of claim 1.

The invention as described in claim 3 is a thermoplastic resin composition in which the polyamide resin is at least one resin selected from a group consisting of polyamide 11, polyamide 6, polyamide 66, polyamide 610, polyamide 612, polyamide 614, polyamide 12, polyamide 6T, polyamide 6I, polyamide 9T, polyamide MST, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T in the description of claim 1 or 2.

The invention as described in claim 4 is a production method of a thermoplastic resin composition in which a polyamide resin is dispersed in a polyolefin resin, and is characterized in that the method has a mixing process in which an olefin resin and a mixed resin obtained by molten blending a polyamide resin and a compatibilizer are subjected to molten blending, and that the compatibilizer is a modified elastomer in which a reactive group which reacts with the polyamide resin is substituted to an elastomer.

Additionally, the invention as described in claim 5 in order to solve the above problems is a plant-derived polyamide resin containing thermoplastic resin composition, and is characterized in that the thermoplastic resin composition is obtained by molten blending the polyamide resin, a polyolefin resin, and a compatibilizer, that the polyamide resin is at least one plant-derived polyamide resin selected from a group consisting of polyamide 11, polyamide 610, polyamide 614, polyamide 1010, and polyamide 10T, that a content of the polyamide resin is in a range from 1% to 80% by mass based on 100% by mass of a total of the polyamide resin, the polyolefin resin, and the compatibilizer, that a content of the polyolefin resin is in a range from 5% to 75% by mass based on 100% by mass of a total of the polyamide resin, the polyolefin resin, and the compatibilizer, that the compatibilizer is an acid-modified olefin-based thermoplastic elastomer, and that a content of the compatibilizer is in a range from 1% to 30% by mass based on 100% by mass of a total of the polyamide resin, the polyolefin resin, and the compatibilizer.

The invention as described in claim 6 is a plant-derived polyamide resin containing thermoplastic resin composition in which the content of the polyamide resin is in a range from 10% to 40% by mass, the content of the polyolefin resin is in a range from 50% to 75% by mass, and the content of the compatibilizer is in a range from 5% to 30% by mass in the description of claim 5.

The invention as described in claim 7 is a plant-derived polyamide resin containing thermoplastic resin composition in which the compatibilizer is a maleic anhydride modified ethylene 1-butene copolymer or an anhydrous maleic acid-modified ethylene octene copolymer in the description of claim 5 or 6.

The invention as described in claim 8 is a plant-derived polyamide resin containing thermoplastic resin composition in which the polyamide resin is at least one selected from the group consisting of polyamide 11, polyamide 610, polyamide 1010, and polyamide 10T, and the polyolefin resin is a polypropylene in the description of claim 7.

The invention as described in claim 9 is a plant-derived polyamide resin containing thermoplastic resin composition in which a specific gravity is in a range from 0.89 to 1.05 in the description of claim 8.

The invention as described in claim 10 is a molded article and is characterized by comprising the plant-derived polyamide resin containing thermoplastic resin composition described in any one of claims 5 to 9.

Effect of the Invention

Since the thermoplastic resin composition of the present invention is obtained by molten blending a polyolefin resin and a mixed resin obtained by molten blending a polyamide resin and a specific compatibilizer, the thermoplastic resin composition is excellent in impact strength as well as rigidity.

In the case where the elastomer is an olefin-based thermoplastic elastomer which is a polymer of ethylene or propylene, and an α-olefin having 3 to 8 carbon atoms, or a styrene-based thermoplastic elastomer, more excellent impact strength and rigidity can be obtained.

In the case where the polyamide resin is a specific resin, it is possible to obtain a material that exhibits both excellent impact strength and excellent rigidity.

Since the production method of a thermoplastic resin composition in the present invention has the mixing process that melt-mixes a polyolefin resin and a mixed resin obtained by molten blending a polyamide resin and a specific compatibilizer, it is possible to easily obtain a thermoplastic resin composition that is excellent in impact strength as well as rigidity.

According to the plant-derived polyamide resin containing thermoplastic resin composition in another present invention, a molded article that utilizes a plant-derived polyamide resin and is excellent in impact strength as well as rigidity can be obtained.

When a content of the polyamide resin is in a range from 10% to 40% by mass, a content of the polyolefin resin is in a range from 50% to 75% by mass, and a content of the compatibilizer is in a range from 5% to 30% by mass, it is possible to obtain a plant-derived polyamide resin containing thermoplastic resin composition and has a reduced specific gravity due to a reduction in the content of the polyamide resin, and is excellent in impact strength as well as rigidity.

When the compatibilizer is an anhydrous maleic acid-modified ethylene 1-butene copolymer or an anhydrous maleic acid-modified ethylene octene copolymer, particularly excellent impact strength and rigidity can be obtained.

When the polyamide resin is polyamide 11, polyamide 610, polyamide 1010, or polyamide 10T, and the polyolefin resin is polypropylene, it is possible to obtain a thermoplastic resin composition that has low specific gravity, and exhibits particularly excellent injection moldability while maintaining the excellent properties of each resin.

When the specific gravity is in a range from 0.89 to 1.05, it is possible to obtain a molded article that has a reduced weight, and exhibits excellent impact strength and excellent rigidity.

The molded article of the present invention exhibits excellent impact strength and excellent rigidity while utilizing a plant-derived polyamide resin.

DESCRIPTION OF EMBODIMENTS

Figure 1:
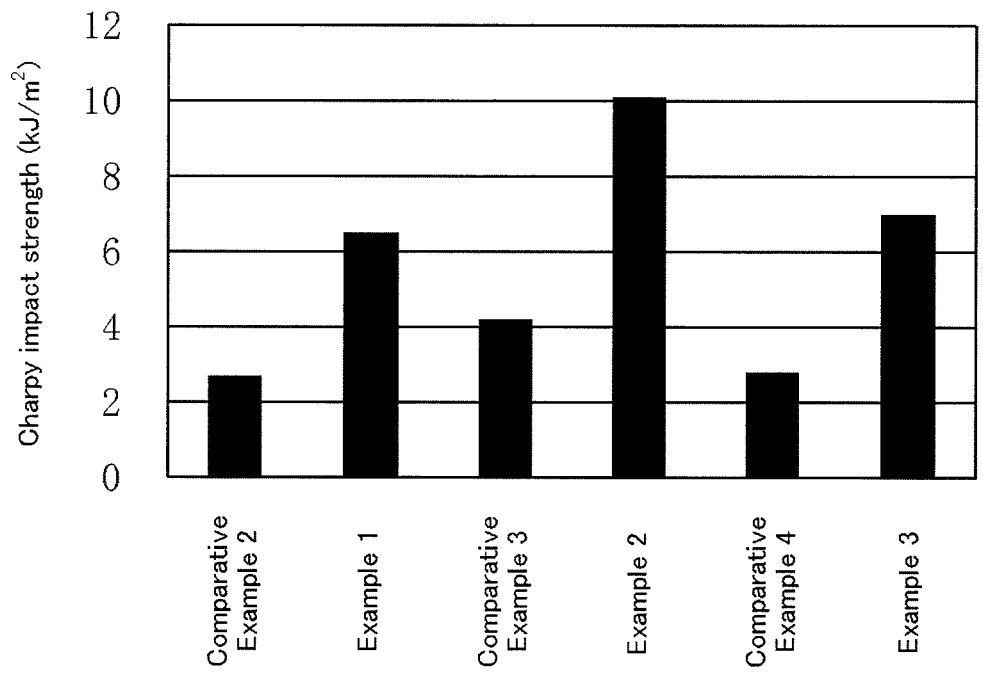
FIG. 1 is a graph relating to Charpy impact strength.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Thermoplastic Resin Composition (I)

The thermoplastic resin composition of the present invention is a thermoplastic resin composition in which a polyamide resin is dispersed in a polyolefin resin and is characterized in that the thermoplastic resin composition is obtained by molten blending the polyolefin resin, and a mixed resin which is obtained by molten blending the polyamide resin and a compatibilizer, and that the compatibilizer is a modified elastomer in which a reactive group which reacts with the polyamide resin is substituted to an elastomer.

This thermoplastic resin composition may be hereinafter referred to as "thermoplastic resin composition (I)".

1-1. Components

The polyamide resin is a polymer having a chain-like skeleton formed by polymerizing a plurality of monomers through an amide bond (—NH—CO—). In the thermoplastic resin composition (I) according to the present invention, the polyamide resin is a resin which forms a dispersed phase with respect to the polyolefin resin (described later).

Examples of a monomer constituting the polyamide resin include an amino acid such as aminocaproic acid, aminoundecanoic acid, aminododecanoic acid, and p-aminomethylbenzoic acid; a lactam such as ε-caprolactam, undecanelactam, and ω-lauryllactam; and the like. These compounds may be used singly or in combination of two or more types thereof.

The polyamide resin can be prepared by copolymerization of a diamine and a dicarboxylic acid. Examples of the diamine used as the monomer include an aliphatic diamine such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; an alicyclic diamine such as cyclohexanediamine and bis(4-aminocyclohexyl)methane; an aromatic diamine such as a xylylenediamine (e.g., p-phenylenediamine and m-phenylenediamine); and the like. These compounds may be used singly or in combination of two or more types thereof.

Examples of the dicarboxylic acid used as the monomer include an aliphatic dicarboxylic acid such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; an alicyclic dicarboxylic acid such as cyclohexanedicarboxylic acid; an aromatic dicarboxylic acid such as phthalic acid, terephthalic acid, isophthalic acid, and napthalenedicarboxylic acid; and the like. These compounds may be used singly or in combination of two or more types thereof.

In the present invention, the polyamide resin is preferably a polyamide resin which includes an amide bond-containing unit having 11 carbon atoms in the main chain. Specifically, it is preferable that the polyamide resin include a structural unit derived from a monomer having 11 carbon atoms. It is particularly preferable that the polyamide resin is a polymer which is produced using 11-aminoundecanoic acid or undecanelactam as a monomer (hereinafter may be referred to as "PA11-based resin"). Since 11-aminoundecanoic acid is a monomer obtained from castor oil, 11-aminoundecanoic acid is desirable from the viewpoint of environmental protection (particularly from the viewpoint of carbon neutral).

The content of the structural unit derived from a monomer having 11 carbon atoms in the PA11-based resin is preferably 50% or more based on the total structural units. Specifically, the content of a structural unit derived from a monomer having less than 11 carbon atoms and/or a structural unit derived from a monomer having 12 or more carbon atoms in the PA11-based resin may be less than 50% based on the total structural units. The PA11-based resin may include only the structural unit derived from a monomer having 11 carbon atoms. Specifically, the PA11-based resin may be polyamide 11 (PA11).

In the thermoplastic resin composition (I) of the present invention, examples of the preferable polyamide other than the PA11-based resin includes polyamide 6, polyamide 66, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, polyamide 9T/2M-8T, and the like.

These polyamides may be used singly or in combination of two or more types thereof.

In the case of using the PA11-based resin and other polyamide, a content of the other polyamide may be less than 40% by mass based on 100% by mass of a total of the polyamide resin.

The polyamide resin preferably has a structure in which half or more (50% or more) of the carbon atoms contained in the main chain form a chain-like skeleton. Specifically, when the polyamide resin includes an aromatic skeleton, it is preferable that less than half (less than 50%) of the carbon atoms in the main chain form the aromatic skeleton.

In the present invention, the polyamide resin may be at least one plant-derived polyamide resin among polyamide 11, polyamide 610, polyamide 614, polyamide 1010, and polyamide 10T. In this case, it is possible to obtain a plant-derived plastic material that is excellent in impact strength and excellent rigidity.

The weight average molecular weight by gel permeation chromatography (GPC) in terms of polystyrene for the polyamide resin is not particularly limited. The weight average molecular weight is preferably in a range from 5,000 to 100,000, more preferably from 7,500 to 50,000, and further preferably from 10,000 to 50,000.

The polyolefin resin in the thermoplastic resin composition (I) according to the present invention is a resin which forms a continuous phase with respect to the polyamide resin.

The polyolefin resin is not particularly limited and various polyolefin can be used. Example thereof includes an ethylene homopolymer, a propylene homopolymer, an ethylene propylene copolymer, an ethylene α-olefin copolymer, a propylene α-olefin copolymer, and the like.

The α-olefin is an unsaturated hydrocarbon compound having carbon atoms of 3 to 8, and example thereof include propylene, 1-butene, 1-pentene, 1-hexene, 1-heptene, 3-methyl-1-butene, 4-methyl-1-pentene, and the like.

These polyolefin resins may be used singly or in combination of two or more types thereof. In other words, the polyolefin resin may be a mixture consisting of the polymers described above.

The weight average molecular weight by GPC in terms of polystyrene for the polyolefin resin is not particularly limited. The weight average molecular weight is preferably in a range from 10,000 to 500,000, more preferably from 100,000 to 450,000, and further preferably from 200,000 to 400,000.

The polyolefin resin is a polyolefin which does not have an affinity with the polyamide resin and does not have a reactive group that reacts with the polyamide resin either. Thus, the polyolefin resin is different from a polyolefin-based component as the compatibilizer to be described below.

The compatibilizer is a modified elastomer in which a reactive group that reacts with the polyamide resin is substituted to an elastomer.

The elastomer is a thermoplastic elastomer in general. Among the thermoplastic elastomer, an olefin-based thermoplastic elastomer and a styrene-based thermoplastic elastomer are preferable.

Examples of the olefin-based thermoplastic elastomer include a copolymer of an α-olefin such as ethylene, propylene, 1-butene, 1-pentene, and 1-octene. Particularly, a polymer of an α-olefin having carbon atoms of 3 to 8 and ethylene or propylene, namely, a polymer of an α-olefin having carbon atoms of 3 to 8 and ethylene, and a polymer of an α-olefin having carbon atoms of 4 to 8 and propylene are preferable.

Specific examples of the olefin-based thermoplastic elastomer include an ethylene propylene copolymer (EPR), an ethylene 1-butene copolymer (EBR), an ethylene 1-pentene copolymer, an ethylene 1-octene copolymer (EOR), a propylene 1-butene copolymer (PBR), a propylene 1-pentene copolymer, a propylene 1-octene copolymer (POR), and the like. Among these, EOR, EBR, and EPR are preferable, and EBR and EOR are particularly preferable.

Examples of the styrene-based thermoplastic elastomer include a block copolymer of styrene-based compound and a diene compound, a hydrogenated polymer thereof, and the like.

Examples of the styrene-based compound include styrene; an alkyl styrene such as α-methyl styrene, p-methyl styrene and p-t-butyl styrene; p-methoxy styrene, vinyl naphthalene, and the like.

Examples of the diene compound include butadiene, isoprene, piperylene, methyl pentadiene, phenyl butadiene, 3,4-dimethyl-1,3-hexadiene, 4,5-diethyl-1,3-octadiene, and the like.

Specific examples of the styrene-based thermoplastic elastomer include a styrene butadiene styrene terpolymer (SBS), a styrene isoprene styrene terpolymer (SIS), a styrene ethylene/butylene styrene tetrapolymer (SEBS), a styrene ethylene/propylene styrene tetrapolymer (SEPS), and the like. Among these, SEBS is preferable.

Examples of the reactive group that can react with the polyamide resin include an acid anhydride group (—CO—O—OC—), a carboxyl group (—COOH), an epoxy group (—$C_2O$ (i.e., a three-membered ring structure consisting of two carbon atoms and one oxygen atom)), an oxazoline group (—$C_3H_4NO$), an isocyanate group (—NCO), and the like. The reactive group may be added to the elastomer using an arbitrary known method.

The reactive group is particularly preferably an acid anhydride group. Examples of a monomer for introducing an acid anhydride group include an acid anhydride such as maleic anhydride, phthalic anhydride, itaconic anhydride, succinic anhydride, glutaric anhydride, adipic anhydride, citraconic anhydride, tetrahydrophthalic anhydride, and butenylsuccinic anhydride. Among these, maleic anhydride, phthalic anhydride, and itaconic anhydride are preferable, and maleic anhydride is particularly preferable.

These monomers may be used singly or in combination of two or more types thereof.

In the case of using a modified elastomer into which an acid group (e.g., acid anhydride group) is introduced as the compatibilizer, an acid group content in the modified elastomer is not particularly limited.

Specific examples of the modified elastomer used as the compatibilizer according to the present invention include an anhydrous maleic acid-modified olefin-based thermoplastic elastomer such as anhydrous maleic acid-modified EPR, anhydrous maleic acid-modified EBR, and anhydrous maleic acid-modified EOR; an anhydrous maleic acid-modified styrene-based thermoplastic elastomer such as anhydrous maleic acid-modified SEBS; and the like. Among these, anhydrous maleic acid-modified EBR, and anhydrous maleic acid-modified EOR are preferable.

The compatibilizer according to the present invention may be used singly or in combination of two or more types thereof.

The weight average molecular weight by gel permeation chromatography in terms of polystyrene for the compatibilizer is not particularly limited. The weight average molecular weight is preferably in a range from 10,000 to 500,000, more preferably from 20,000 to 500,000, and further preferably from 30,000 to 300,000.

1-2. Thermoplastic Resin Composition (I)

Content ratios of a component derived from the polyamide resin, a component derived from the polyolefin resin, and a component derived from the compatibilizer in the thermoplastic resin composition (I) of the present invention are not particularly limited.

A content ratio of a component derived from the polyamide resin is preferably in a range from 1% to 90% by mass, more preferably from 10% to 50% by mass, and further preferably from 15% to 30% by mass with respect to 100% by mass of the sum of the polyamide resin, the polyolefin resin, and the compatibilizer.

A content ratio of a component derived from the polyolefin resin is preferably in a range from 1% to 90% by mass, more preferably from 10% to 80% by mass, and further preferably from 40% to 70% by mass with respect to 100% by mass of the sum of the polyamide resin, the polyolefin resin, and the compatibilizer.

A content ratio of a component derived from the compatibilizer is preferably in a range from 1% to 50% by mass, more preferably from 3% to 40% by mass, and further preferably from 5% to 30% by mass with respect to 100% by mass of a sum of the polyamide resin, the polyolefin resin, and the compatibilizer.

In the thermoplastic resin composition (I), the polyamide resin is dispersed in the polyolefin resin. It is preferable that the polyamide resin dispersed in the polyolefin resin has as small a particle size as possible. Specifically, it is preferable that the polyamide resin is finely dispersed in the polyolefin resin which is a matrix phase.

The particle size of the polyamide resin dispersed in the polyolefin resin is preferably in a range from 10 to 20,000 nm, more preferably from 50 to 10,000 nm, and further preferably from 100 to 5,000 nm.

The particle size and the like can be measured based on images obtained using an electron microscope or the like.

The thermoplastic resin composition (I) is obtained by molten blending a polyolefin resin, and a mixed resin which is obtained by molten blending a polyamide resin and a compatibilizer.

The "mixed resin" will be described in detail with reference to a production method of the thermoplastic resin composition (I) below. The molten blending of the mixed resin and the polyolefin resin will also be described in detail with reference to a production method of the thermoplastic resin composition (I) below.

2. Production Method of Thermoplastic Resin Composition (I)

The production method of the thermoplastic resin composition (I) of the present invention is a production method of the thermoplastic resin composition (I) in which a polyamide resin is dispersed in a polyolefin resin, and is characterized in that the method has a mixing process in which an olefin resin and a mixed resin obtained by molten blending a polyamide resin and a compatibilizer are subjected to molten blending, and that the compatibilizer is a modified elastomer in which a reactive group that reacts with the polyamide resin is substituted to an elastomer.

2-1 Raw Material

The above explanation about the "polyolefin resin", "polyamide resin", and "compatibilizer" can be applied hereto.

2-2. Mixing Process

The mixing process is a step of molten blending a polyolefin resin and a mixed resin obtained by mixing a polyamide resin and a compatibilizer.

When the mixed resin obtained by molten blending the polyamide resin and the compatibilizer in advance is used, the function of the compatibilizer can be more effectively. It is considered that a situation in which the compatibilizer is independently dispersed in the polyolefin resin without achieving its function can be suppressed by mixing the compatibilizer with the polyamide resin (dispersion phase) in advance.

The mixed resin may be solidified by pelletization or the like, or may be melt.

The mixed resin may be obtained by melt-mixing the polyamide resin and the compatibilizer using a mixing device such as an extruder (e.g., single-screw extruder or twin-screw extruder), a kneader, and a mixer (e.g., high-speed flow mixer, puddle mixer, or ribbon mixer). These mixing devices may be used either alone or in combination. In the case of using two or more mixing devices, the mixing devices may be operated continuously, or may be operated batch type. The polyamide resin and the compatibilizer may be mixed at a time, or may be mixed while adding the polyamide resin or the compatibilizer in parts (multi-step addition).

The mixing temperature employed when molten blending the polyamide resin and the compatibilizer is not particularly limited. The mixing temperature may be appropriately adjusted corresponding to the type of each component. It is particularly preferable to mix the polyamide resin and the compatibilizer in a state in which each compound is melted. The mixing temperature is specifically in a range from 190° C. to 350° C., preferably from 200° C. to 330° C., and more preferably 205° C. to 310° C.

In the mixing process, the molten blending can be conducted using a mixing device such as an extruder (e.g., single-screw extruder or twin-screw extruder), a kneader, and a mixer (e.g., high-speed flow mixer, puddle mixer, or ribbon mixer). These mixing devices may be used either alone or in combination. In the case of using two or more mixing devices, the mixing devices may be operated continuously, or may be operated batch type. The first mixed resin and the polyolefin resin may be mixed at a time, or may be mixed while adding the components in parts (multi-step addition).

The mixing temperature employed in the mixing process is not particularly limited as long as the components can be molten blended. The mixing temperature may be appropriately adjusted corresponding to the type of each component. It is particularly preferable to mix the components in a state in which the compounds are melted. The mixing temperature is specifically in a range from 190° C. to 350° C., preferably from 200° C. to 330° C., and more preferably 205° C. to 310° C.

The mixing process may be implemented by (1) molten blending the polyolefin resin with the mixed resin that is solidified by pelletization or the like in advance, or (2) molten blending the polyamide resin and the compatibilizer on the upstream side using a multi-step addition-type mixing device or the like, and adding the polyolefin resin on the downstream side within the device to mix the polyolefin resin and a melt-mixture (mixed resin) of the polyamide resin and the compatibilizer.

Mixing ratios of the polyamide resin, the polyolefin resin, and the compatibilizer in the production method of the thermoplastic resin composition (I) in the present invention are not particularly limited.

A mixing ratio of the polyamide resin is preferably in a range from 1% to 90% by mass, more preferably from 10% to 50% by mass, and further preferably from 15% to 30% by mass with respect to 100% by mass of a total of the polyamide resin, the polyolefin resin, and the compatibilizer.

A mixing ratio of the polyolefin resin is preferably in a range from 1% to 90% by mass, more preferably from 10% to 80% by mass, and further preferably from 40% to 90% by mass with respect to 100% by mass of a total of the polyamide resin, the polyolefin resin, and the compatibilizer.

A mixing ratio of the compatibilizer is preferably in a range from 1% to 50% by mass, more preferably from 3% to 40% by mass, and further preferably from 5% to 30% by mass with respect to 100% by mass of a total of the polyamide resin, the polyolefin resin, and the compatibilizer.

The thermoplastic resin composition of the present invention may contain components other than the polyamide resin, the polyolefin resin, and the compatibilizer within a range that does not impede the object of the invention. Examples of the other components include thermoplastic resins other than the above-described ones, a flame retardant, a flame retardant aid, fillers, a coloring agent, an antibacterial agent, an anti-static agent, and the like. These components may be used singly or in combination of two or more types thereof.

Examples of the other thermoplastic resins include a polyester-based resin such as polybutylene terephthalate, polyethylene terephthalate, polycarbonate, polybutylene succinate, polyethylene succinate and poly lactic acid; and the like.

Examples of the flame retardant include a halogen-based flame retardant such as a halogenated aromatic compound; a phosphorus-based flame retardant such as a nitrogen-containing phosphate compound and a phosphate ester; a nitrogen-based flame retardant such as guanidine, triazine, melamine, and derivatives thereof; an inorganic flame retardant such as a metal hydroxide; a boron-based flame retardant; a silicone-based flame retardant; a sulfur-based flame retardant; a red phosphorus-based flame retardant; and the like.

Examples of the flame retardant aid include various antimony compounds, metal compounds containing zinc, metal compounds containing bismuth, magnesium hydroxide, clayey silicates, and the like.

Examples of the fillers include glass components including a glass fiber, glass beads, a glass flake, and the like; silica; an inorganic fiber such as a glass fiber, an alumina fiber, and a carbon fiber; graphite; a silicic acid compound such as calcium silicate, aluminum silicate, kaolin, talc, and clay; a metal oxide such as iron oxide, titanium oxide, zinc oxide, antimony oxide, and alumina; a carbonate or sulfate of a metal such as calcium, magnesium, and zinc; an organic fiber such as an aromatic polyester fiber, an aromatic polyamide fiber, a fluoric resin fiber, a polyimide fiber, and a vegetable fiber; and the like.

Examples of the colorant include pigments and dyes.

3. Molded Article

The thermoplastic resin composition (I) of the present invention may be formed using an optionally method. The shape, size, thickness, and the like of the resulting molded article are not particularly limited. Application use thereof is not particularly limited. The molded article is used as an exterior material, an interior material, or a structural material for automobiles, rail vehicles, ships, airplanes, and the like. Examples of the automotive materials include an automotive exterior material, an automotive interior material, an automotive structural material, an engine room part, and the like. Specific examples of the automotive materials include a bumper, a spoiler, a cowling, a front grille, a garnish, a bonnet, a trunk lid, a fender panel, a door panel, a roof panel, an instrument panel, a door trim, a quarter trim, a roof lining, a pillar garnish, a deck trim, a tonneau board, a package tray, a dashboard, a console box, a kicking plate, a switch base, a sheet backboard, a sheet frame, an armrest, a sun visor, an intake manifold, an engine head cover, an engine under cover, an oil filter housing, a housing of an on-board electronic device (e.g., ECU or TV monitor), an air filter box, and the like. The molded article may also be used as an interior material, an exterior material, and a structural material used for buildings, furniture, and the like. For example, the molded article may be used as a door mounting material, a door structural material, a furniture (e.g., desk, chair, shelf, or chest of drawers) mounting/structural material, and the like. The molded article may also be used as a package, a container (e.g., tray), a protective member, a partition member, and the like. The molded article may also be used as a housing and a structural member of home appliances (e.g., flat TV, refrigerator, washing machine, cleaner, mobile phone, portable game machine, and notebook-sized personal computer).

4. Thermoplastic Resin Composition (II)

The plant-derived polyamide resin containing thermoplastic resin composition of the present invention is characterized in that the thermoplastic resin composition is obtained by molten blending the polyamide resin, a polyolefin resin, and a compatibilizer, that the polyamide resin is at least one plant-derived polyamide resin selected from a group consisting of polyamide 11, polyamide 610, polyamide 614, polyamide 1010, and polyamide 10T, that a content of the polyamide resin is in a range from 1% to 80% by mass based on 100% by mass of a total of the three components, that a content of the polyolefin resin is in a range from 5% to 75% by mass based on 100% by mass of a total of the three components, that the compatibilizer is an acid-modified olefin-based thermoplastic elastomer, and that a content of the compatibilizer is in a range from 1% to 30% by mass based on 100% by mass of a total of the three components.

Hereinafter, this thermoplastic resin composition may be referred to as "thermoplastic resin composition (II)".

Components (1) Polyamide Resin

The polyamide resin is a polymer having a chain-like skeleton formed by polymerizing a plurality of monomers through an amide bond (—NH—CO—). In the thermoplastic resin composition (II) according to the present invention, the polyamide resin is at least one polyamide resin selected from polyamide 11 (hereinafter may be simply referred to as "PA11"), polyamide 610 (hereinafter may be simply referred to as "PA610"), polyamide 614 (hereinafter may be simply referred to as "PA614"), polyamide 1010 (hereinafter may be simply referred to as "PA1010"), and polyamide 10T (hereinafter may be simply referred to as "PA10T").

PA11 is a polyamide resin having a structure in which monomers having 11 carbon atoms are bonded through an amide bond. PA11 is normally obtained using aminoundecanoic acid or undecanelactam as a monomer. Since aminoundecanoic acid is a monomer obtained from castor oil, PA11 is desirable from the viewpoint of environmental protection (particularly from the viewpoint of carbon neutral). A content of a structural unit derived from the monomer having 11 carbon atoms in PA11 is preferably 50% or more based on the total structural units and may be 100%.

PA610 is a polyamide resin having a structure in which a monomer having 6 carbon atoms and a monomer having 10 carbon atoms are bonded through an amide bond. PA610 is normally obtained by copolymerizing a diamine and a dicarboxylic acid. Hexamethylenediamine and sebacic acid are respectively used as the diamine and the dicarboxylic acid. Since sebacic acid is a monomer obtained from castor oil, PA610 is desirable from the viewpoint of environmental protection (particularly from the viewpoint of carbon neutral). A total content of a structural unit derived from the monomer having 6 carbon atoms and a structural unit derived from the monomer having 10 carbon atoms in PA610 is preferably 50% or more based on the total structural units and may be 100%.

PA1010 is a polyamide resin having a structure in which a diamine having 10 carbon atoms and a dicarboxylic acid having 10 carbon atoms are copolymerized. PA1010 is normally obtained using 1,10-decanediamine (decamethylenediamine) and sebacic acid. Since decamethylenediamine and sebacic acid are monomers obtained from castor oil, PA1010 is desirable from the viewpoint of environmental protection (particularly from the viewpoint of carbon neutral). A total content of a structural unit derived from the diamine having 10 carbon atoms and a structural unit derived from the dicarboxylic acid having 10 carbon atoms in PA1010 is preferably 50% or more based on the total structural units and may be 100%.

PA614 is a polyamide resin having a structure in which a monomer having 6 carbon atoms and a monomer having 14 carbon atoms are bonded through an amide bond. PA614 is normally obtained by copolymerizing a diamine (specifically hexamethylenediamine) and a plant-derived dicarboxylic acid having 14 carbon atoms. Since the plant-derived dicarboxylic acid is used, PA614 is desirable from the viewpoint of environmental protection (particularly from the viewpoint of carbon neutral). A total content of a structural unit derived from the monomer having 6 carbon atoms and a structural unit derived from the monomer having 14 carbon atoms in PA614 is preferably 50% or more based on the total structural units and may be 100%.

PA10T is a polyamide resin having a structure in which a diamine having 10 carbon atoms and terephthalic acid are bonded through an amide bond. PA10T is normally obtained using 1,10-decanediamine (decamethylenediamine) and terephthalic acid. Since decamethylenediamine is a monomer obtained from castor oil, PA10T is desirable from the viewpoint of environmental protection (particularly from the viewpoint of carbon neutral). A total content of a structural unit derived from the diamine having 10 carbon atoms and a structural unit derived from terephthalic acid in PA10T is preferably 50% or more based on the total structural units and may be 100%.

Among the above five plant-derived polyamide resins, PA11 is superior to the other plant-derived polyamide resins from the viewpoint of low water absorption, low density, and high plant-derived content.

PA610 is inferior to PA11 as to water absorption, chemical resistance, and impact strength, but is superior to PA11 from the viewpoint of heat resistance (melting point) and rigidity (strength). Since PA610 exhibits low water absorption and high dimensional stability as compared with polyamide 6 and polyamide 66, PA610 can be used as an alternative to polyamide 6 and polyamide 66.

PA1010 is superior to PA11 from the viewpoint of heat resistance and rigidity. PA1010 has a plant-derived content almost equal to that of PA11, and may be used for parts for which durability is desired.

Since PA10T includes an aromatic ring in the molecular skeleton, PA10T has a high melting point and high rigidity as compared with PA1010. Therefore, PA10T can be used under a severe environment (e.g., a part for which high heat resistance or input resistance is required).

A content of the polyamide resin (plant-derived polyamide resin) is in a range from 1% to 80% by mass based on 100% by mass of a total content of the polyamide resin, the polyolefin resin, and the compatibilizer. When the content of the polyamide resin is within the above range, it is possible to obtain a molded article that is excellent in impact strength as well as rigidity. The content of the polyamide resin is preferably in a range from 10% to 40% by mass. When the content of the polyamide resin is within the above range, the polyolefin resin serves as a matrix phase, the polyamide resin (plant-derived polyamide resin) serves as a dispersed phase, and the polyamide resin can be micro-dispersed in the matrix phase. Moreover, a specific gravity of the entire thermoplastic resin composition (II) can be reduced by reducing the amount of the polyamide resin having a high specific gravity. This makes it possible to obtain a molded article that has a reduced weight, and exhibits excellent impact strength and excellent rigidity. The content of the polyamide resin is more preferably in a range from 10% to 35% by mass, and particularly from 10% to 30% by mass.

(2) Polyolefin Resin

The polyolefin resin is an olefin homopolymer and/or an olefin copolymer. Examples of the olefin include ethylene, propylene, 1-butene, 3-methyl-1-butene, 1-pentene, 3-methyl-1-pentene, 4-methyl-1-pentene, 1-hexene, 1-octene, and the like.

Examples of the polyolefin resin include polyethylene resin, polypropylene resin, poly(1-butene), poly(1-hexene), poly(4-methyl-1-pentene), and the like. These polymers may be used singly or in combination of two or more types thereof. The polyolefin resin may be a mixture of these polymers.

Examples of the polyethylene resin include an ethylene homopolymer, and a copolymer of ethylene and another olefin. Examples of the copolymer of ethylene and another olefin include ethylene 1-butene copolymer, ethylene 1-hexene copolymer, ethylene 1-octene copolymer, ethylene 4-methyl-1-pentene copolymer, and the like. Note that units derived from ethylene account for 50% or more of the total structural units included in these copolymers.

Examples of the polypropylene resin include propylene homopolymer, propylene ethylene copolymer, propylene 1-butene copolymer, and the like. Note that units derived from propylene account for 50% or more of the total structural units included in these copolymers.

Among these, the polyethylene resin and the polypropylene resin are preferable, and the polypropylene resin is particularly preferable from the viewpoint of impact strength. The polypropylene resin may be a mixed resin of a polypropylene resin and a polyethylene resin. In this case, a content ratio of the polypropylene resin is 50% or more by mass based on 100% by mass of a total content of the polypropylene resin and the polyethylene resin.

The weight average molecular weight by GPC in terms of polystyrene for the polyolefin resin is not particularly limited. The weight average molecular weight is preferably in a range from 10,000 to 500,000, more preferably from 100,000 to 450,000, and further preferably from 200,000 to 400,000.

A content of the polyolefin resin is in a range from 5% to 75% by mass based on 100% by mass of a total content of the polyamide resin (plant-derived polyamide resin), the polyolefin resin, and the compatibilizer. When the content of the polyolefin resin is within the above range, it is possible to obtain a molded article that is excellent in impact strength as well as rigidity. The content of the polyolefin resin is preferably in a range from 50% to 75% by mass. When the content of the polyolefin resin is within the above range, the polyolefin resin serves as a matrix phase, the polyamide resin (plant-derived polyamide resin) serves as a dispersed phase, and the polyamide resin can be micro-dispersed in the matrix phase. Moreover, a specific gravity of the entire thermoplastic resin composition (II) can be reduced by reducing the amount of the polyamide resin having a high specific gravity. This makes it possible to obtain a molded article that has a reduced weight, and exhibits excellent impact strength and excellent rigidity. The content of the polyolefin resin is more preferably in a range from 52.5% to 75% by mass, and particularly from 55% to 70% by mass.

Since the content of the polyamide resin can be reduced while sufficiently maintaining the mechanical properties, the surface glossiness of the resulting molded article can be reduced (i.e., a good external appearance can be obtained). Therefore, the molded article can be applied to an exterior material or an interior material that is observed directly, and excellent design can be implemented.

The polyolefin resin is a polyolefin which does not have an affinity with the polyamide resin and does not have a reactive group that reacts with the polyamide resin either. Thus, the polyolefin resin is different from a polyolefin-based component as the compatibilizer to be described below.

(3) Compatibilizer

The compatibilizer is an acid-modified olefin-based thermoplastic elastomer. Specifically, the compatibilizer is a modified elastomer obtained by introducing an acid group that can interact with the polyamide resin into an olefin-based thermoplastic elastomer.

Examples of the olefin-based thermoplastic elastomer include an elastomer obtained by copolymerizing two or more olefins. Examples of the olefin include ethylene, propylene, an α-olefin having 4 to 8 carbon atoms, and the like. Examples of the α-olefin having 4 to 8 carbon atoms include 1-butene, 3-methyl-1-butene, 1-pentene, 3-methyl-1-pentene, 4-methyl-1-pentene, 1-hexene, 1-octene, and the like.

Among these, a copolymer of ethylene and an α-olefin having 3 to 8 carbon atoms, and a copolymer of propylene and an α-olefin having 4 to 8 carbon atoms are preferable as the olefin-based thermoplastic elastomer.

Examples of the copolymer of ethylene and an α-olefin having 3 to 8 carbon atoms include an ethylene propylene copolymer (EPR), an ethylene 1-butene copolymer (EBR), an ethylene 1-pentene copolymer, and an ethylene 1-octene copolymer (EOR). Examples of the copolymer of propylene and an α-olefin having 4 to 8 carbon atoms include a propylene 1-butene copolymer (PBR), a propylene 1-pentene copolymer, a propylene 1-octene copolymer (POR), and the like. Among these, EPR, EBR, and EOR are preferable, and EBR and EOR are more preferable.

Examples of the acid group that is introduced into the olefin-based thermoplastic elastomer include an acid anhydride group (—CO—O—OC—) and/or a carboxyl group (—COOH), and the like. The acid group (reactive group) may be introduced into the elastomer using an arbitrary known method.

The acid group is particularly preferably an acid anhydride group. Examples of a monomer for introducing an acid anhydride group include an acid anhydride such as maleic anhydride, phthalic anhydride, itaconic anhydride, succinic anhydride, glutaric anhydride, adipic anhydride, citraconic anhydride, tetrahydrophthalic anhydride, and butenylsuccinic anhydride. Among these, maleic anhydride, phthalic anhydride, and itaconic anhydride are preferable, and maleic anhydride is particularly preferable.

These monomers may be used singly or in combination of two or more types thereof.

Specifically, an anhydrous maleic acid-modified ethylene 1-butene copolymer and an anhydrous maleic acid-modified ethylene octene copolymer are particularly preferable as the acid-modified olefin-based thermoplastic elastomer. When these compatibilizers are used, it is possible to implement excellent impact strength and excellent rigidity in combination while achieving a low specific gravity, being favorable.

In the case of using an olefin-based thermoplastic elastomer into which an acid group (e.g., acid anhydride group) is introduced as the compatibilizer, an acid group content in the olefin-based thermoplastic elastomer is not particularly limited.

A content of the compatibilizer is in a range from 1% to 30% by mass based on 100% by mass of a total content of the polyamide resin (plant-derived polyamide resin), the polyolefin resin, and the compatibilizer. When the content of the compatibilizer is within the above range, it is possible to obtain a molded article that is excellent in impact strength as well as rigidity. The content of the compatibilizer is preferably in a range from 5% to 30% by mass. When the content of the compatibilizer is within the above range, the polyolefin resin serves as a matrix phase, the polyamide resin (plant-derived polyamide resin) serves as a dispersed phase, and the polyamide resin can be micro-dispersed in the matrix phase. Moreover, this makes it possible to obtain a molded article that exhibits excellent impact strength and excellent rigidity. The content of the compatibilizer is more preferably in a range from 10% to 30% by mass, and particularly from 10% to 25% by mass.

The thermoplastic resin composition (II) that utilizes the plant-derived polyamide resin in the present invention exhibits excellent flowability. In particular, the thermoplastic resin composition (II) exhibits excellent flowability and excellent formability when the content of the polyamide resin is in a range from 10% to 40% by mass, the content of the polyolefin resin is in a range from 50% to 75% by mass, and the content of the acid-modified olefin-based thermoplastic elastomer is in a range from 5% to 30% by mass.

A specific gravity of the thermoplastic resin composition (II) that utilizes the plant-derived polyamide resin in the present invention is not particularly limited, but may normally be 1.05 or less. In particular, the specific gravity thereof may be in a range from 0.89 to 1.05, and be preferably from 0.92 to 0.98 when the content of polyamide 11 is in a range from 1% to 40% by mass %, the content of a polypropylene resin is in a range from 50% to 75% by mass, and the content of the anhydrous maleic acid-modified olefin-based thermoplastic elastomer is in a range from 5% to 30% by mass. Specifically, the thermoplastic resin composition (II) that utilizes the plant-derived polyamide resin in the present invention may have a specific gravity almost equal to those of a polyethylene resin and a polypropylene resin, but exhibits remarkably excellent impact strength and rigidity as compared with a polyethylene resin or a polypropylene resin.

(4) Other Components

The thermoplastic resin composition (II) that utilizes the plant-derived polyamide of the present invention resin may contain components other than the polyamide resin, the polyolefin resin, and the compatibilizer.

The polyamide resin is the above-mentioned plant-derived polyamide resin, however, the thermoplastic resin composition (II) of the present invention may include an additional polyamide resin other than the polyamide resin that is selected from the plant-derived polyamide resins as long as the object of the invention is not impaired.

The other polyamide resin can be prepared by polycondensation of a diamine and a dicarboxylic acid. Examples of the diamine used as the monomer include an aliphatic diamine such as ethylenediamine, 1,3-diaminopropane, 1,4-diaminobutane, 1,6-diaminohexane, 1,7-diaminoheptane, 1,8-diaminooctane, 1,9-diaminononane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; an alicyclic diamine such as cyclohexanediamine and bis(4-aminocyclohexyl)methane; an aromatic diamine such as a xylylenediamine (e.g., p-phenylenediamine and m-phenylenediamine); and the like. These compounds may be used singly or in combination of two or more types thereof.

Examples of the dicarboxylic acid used as the monomer include an aliphatic dicarboxylic acid such as oxalic acid, malonic acid, succinic acid, glutaric acid, adipic acid, pimelic acid, suberic acid, azelaic acid, undecanedioic acid, dodecanedioic acid, brasylic acid, tetradecanedioic acid, pentadecanedioic acid, and octadecanedioic acid; an alicyclic dicarboxylic acid such as cyclohexanedicarboxylic acid; an aromatic dicarboxylic acid such as phthalic acid, terephthalic acid, isophthalic acid, and napthalenedicarboxylic acid; and the like. These compounds may be used singly or in combination of two or more types thereof.

Examples of the other polyamide resin include polyamide 6, polyamide 66, polyamide 612, polyamide 12, polyamide 6T, polyamide 6I, polyamide 9T, polyamide M5T, and the like. These other polyamide resins may be used singly or in combination of two or more types thereof. In the case of containing the other polyamide resin, a content thereof is less than 40% by mass based on 100% by mass of a total content the polyamide resin (plant-derived polyamide resin) and the other polyamide resin.

It is preferable that the other polyamide resin have a structure in which half or more (50% or more) of the carbon atoms that form the main chain form a chain-like skeleton. Specifically, when the other polyamide resin has an aromatic skeleton, it is preferable that less than half (less than 50%) of the carbon atoms that form the main chain form the aromatic skeleton.

The compatibilizer is an acid-modified olefin-based thermoplastic elastomer, however, the thermoplastic resin composition (II) of the present invention may include an additional compatibilizer other than the compatibilizer that is the acid-modified olefin-based thermoplastic elastomer as long as the object of the invention is not impaired.

For example, a modified thermoplastic elastomer to which a reactive group that can react with the polyamide resin may be used as a modified thermoplastic elastomer other than the acid-modified olefin-based thermoplastic elastomer. An olefin-based thermoplastic elastomer and a styrene-based thermoplastic elastomer are preferable as the thermoplastic elastomer used as the other thermoplastic elastomer.

Examples of the olefin-based thermoplastic elastomer include those mentioned above. Examples of the styrene-based thermoplastic elastomer include a block copolymer of a styrene-based compound and a conjugated diene compound, and a hydrogenated product thereof.

Examples of the styrene-based compound include styrene; an alkyl styrene such as α-methyl styrene, p-methyl styrene and p-t-butyl styrene; p-methoxy styrene, vinyl naphthalene, and the like.

Examples of the diene compound include butadiene, isoprene, piperylene, methyl pentadiene, phenyl butadiene, 3,4-dimethyl-1,3-hexadiene, 4,5-diethyl-1,3-octadiene, and the like.

Specific examples of the styrene-based thermoplastic elastomer include a styrene butadiene styrene terpolymer (SBS), a styrene isoprene styrene terpolymer (SIS), a styrene ethylene/butylene styrene tetrapolymer (SEBS), a styrene ethylene/propylene styrene tetrapolymer (SEPS), and the like.

Examples of the reactive group that can react with the polyamide resin include an acid anhydride group (—CO—O—OC—) a carboxyl group (—COOH), an epoxy group (—C$_{20}$ (i.e., a three-membered ring structure consisting of two carbon atoms and one oxygen atom)), an oxazoline group (—C$_3$H$_4$NO), an isocyanate group (—NCO), and the like. The reactive group may be added to the elastomer using an arbitrary known method.

Specifically, examples of the other compatibilizer include an epoxy-modified olefin-based thermoplastic elastomer, an acid-modified styrene-based thermoplastic elastomer, an epoxy-modified styrene-based thermoplastic elastomer, and the like. Examples of the acid-modified styrene-based thermoplastic elastomer include an anhydrous maleic acid-modified styrene-based thermoplastic elastomer such as an anhydrous maleic acid-modified SEBS. These other compatibilizers may be used singly or in combination of two or more types thereof.

Further a thermoplastic resin other than the polyamide resin, the polyolefin resin, and the compatibilizer, a flame retardant, a flame retardant aid, a filler, a coloring agent, an antibacterial agent, an antistatic agent, and the like may be exemplified. These components may be used singly or in combination of two or more types thereof.

Examples of the other thermoplastic resins include a polyester-based resin such as polybutylene terephthalate, polyethylene terephthalate, polycarbonate, polybutylene succinate, polyethylene succinate and poly lactic acid; and the like.

Examples of the flame retardant include a halogen-based flame retardant such as a halogenated aromatic compound; a phosphorus-based flame retardant such as a nitrogen-containing phosphate compound and a phosphate ester; a nitrogen-based flame retardant such as guanidine, triazine, melamine, and derivatives thereof; an inorganic flame retardant such as a metal hydroxide; a boron-based flame retardant; a silicone-based flame retardant; a sulfur-based flame retardant; a red phosphorus-based flame retardant; and the like.

Examples of the flame retardant aid include various antimony compounds, metal compounds containing zinc, metal compounds containing bismuth, magnesium hydroxide, clayey silicates, and the like.

Examples of the fillers include glass components including a glass fiber, glass beads, a glass flake, and the like; silica; an inorganic fiber such as a glass fiber, an alumina fiber, and a carbon fiber; graphite; a silicic acid compound such as calcium silicate, aluminum silicate, kaolin, talc, and clay; a metal oxide such as iron oxide, titanium oxide, zinc oxide, antimony oxide, and alumina; a carbonate or sulfate of a metal such as calcium, magnesium, and zinc; an organic fiber such as an aromatic polyester fiber, an aromatic polyamide fiber, a fluoric resin fiber, a polyimide fiber, and a vegetable fiber; and the like.

Examples of the coloring agent include pigments and dyes.

5. Production Method

The thermoplastic resin composition (II) that utilizes the plant-derived polyamide resin in the present invention is not particularly limited and can be produced by mixing a polyamide resin, a polyolefin resin, and a compatibilizer. For example, the thermoplastic resin composition (II) may be obtained by (1) mixing a polyamide resin, a polyolefin resin, and a compatibilizer at a same time, (2) mixing a polyolefin resin and a mixed resin obtained by mixing a polyamide resin and a compatibilizer, or (3) mixing a polyamide resin and a mixed resin obtained by mixing a polyolefin resin and a compatibilizer. In the case of applying the method (2), more excellent impact strength and rigidity can be obtained as compared with the methods (1) and (3) even when the amount of each component is identical.

The mixing method used in each process is not particularly limited. For example, the mixing process may be performed using a mixing device such as an extruder (e.g., single-screw extruder or twin-screw extruder), a kneader, and a mixer (e.g., high-speed flow mixer, puddle mixer, or ribbon mixer). These mixing devices may be used either alone or in combination. In the case of using two or more mixing devices, the mixing devices may be operated continuously, or may be operated batch type.

The components may be mixed at a time, or may be mixed while adding the components in parts (multi-step addition).

The mixing temperature employed in the mixing process is not particularly limited as long as the components can be molten blended. The mixing temperature may be appropriately adjusted corresponding to the type of each component. It is particularly preferable to mix the components in a state in which the thermoplastic resin is melted. The mixing temperature is specifically in a range from 190° C. to 350° C., preferably from 200° C. to 330° C., and more preferably 205° C. to 310° C.

6. Molded Article

The thermoplastic resin composition (II) obtained by the above method may be formed using an arbitrary method. The shape, size, thickness, and the like of the resulting molded article are not particularly limited. Application use thereof is not particularly limited.

The molded article of the present invention is used as an exterior material, an interior material, or a structural material for automobiles, rail vehicles, ships, airplanes, and the like. Examples of the automotive materials include an automotive exterior material, an automotive interior material, an automotive structural material, an engine room part, and the like. Specific examples of the automotive materials include a bumper, a spoiler, a cowling, a front grille, a garnish, a bonnet, a trunk lid, a fender panel, a door panel, a roof panel, an instrument panel, a door trim, a quarter trim, a roof lining, a pillar garnish, a deck trim, a tonneau board, a package tray, a dashboard, a console box, a kicking plate, a switch base, a sheet backboard, a sheet frame, an armrest, a sun visor, an intake manifold, an engine head cover, an engine under cover, an oil filter housing, an air filter box, an ECU box, a housing of an on-board electronic device (e.g., TV monitor), and the like.

Further, the molded article may also be used as a housing or a structural member of home appliances (e.g., flat TV, refrigerator, washing machine, cleaner), a mobile phone, a portable game machine, a laptop computer, or the like.

In addition, the molded article is used as an interior material, an exterior material, or a structural material used for buildings, furniture, and the like. For example, the molded article may be used as a door mounting material, a door structural material, a furniture (e.g., desk, chair, shelf, or chest of drawers) mounting/structural material, and the like. The molded article may also be used as a package, a container (e.g., tray), a protective member, a partition member, and the like.

EXAMPLES

Hereinafter, the present invention will be described in more detail by way of Examples.

[1-1] Production of Thermoplastic Resin Composition (I) Using PA11 as Polyamide Resin, and Making of Test Piece Example 1

(1) Preparation of Mixed Resin

PA11 "Risilan BMN O" (nylon 11 resin, Mw=18,000, mp=190° C.) manufactured by ARKEMA K.K. was used as a polyamide resin (A). Anhydrous maleic acid-modified EPR "Tafmer MP0620" (MFR=0.3 g/10 min. at 230° C.) manufactured by Mitsui Chemicals Inc. was used as a compatibilizer (C). Each pellet thereof was dry-blended so as to have a mixing ratio as listed in Table 1. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 1. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Example 1.

After that, the resulting thermoplastic resin composition pellet for Example 1 was put into a hopper of an injection molding machine (40-ton injection molding machine) manufactured by Nissei Plastic Ind., Co., Ltd., to prepare a test piece for evaluation under conditions of a set temperature at 210° C. and a mold temperature at 60° C.

Example 2

A pellet of thermoplastic resin composition for Example 2 was produced in the same manner as that in Example 1 except that anhydrous maleic acid-modified EBR "Tafmer MH7020" (MFR=1.5 g/10 min. at 230° C.) manufactured by Mitsui Chemicals Inc. was used as a compatibilizer (C) and each pellet thereof was dry-blended so as to have a mixing ratio as listed in Table 1. After that, injection molding was carried out in the same manner as that in Example 1 to prepare a test piece for Example 2.

Example 3

A pellet of thermoplastic resin composition for Example 3 was produced in the same manner as that in Example 1 except that anhydrous maleic acid-modified SEBS "Tuftec M1913" (MFR=5.0 g/10 min. at 230° C.) manufactured by Asahi Kasei Chemicals Corp. was used as a compatibilizer (C) and each pellet thereof was dry-blended so as to have a mixing ratio as listed in Table 1. After that, injection molding was carried out in the same manner as that in Example 1 to prepare a test piece for Example 3.

Example 4

A pellet of thermoplastic resin composition for Example 4 was produced in the same manner as that in Example 1 except that anhydrous maleic acid-modified EOR "AMPLIFY GR216" (Mw=150,000, anhydrous maleic acid-modified content: 0.8 wt %) manufactured by The Dow Chemical Company was used as a compatibilizer (C) and each pellet thereof was dry-blended so as to have a mixing ratio as listed in Table 1. After that, injection molding was carried out in the same manner as that in Example 1 to prepare a test piece for Example 4.

Examples 5 to 18

Pellets of thermoplastic resin compositions for Examples 5 to 18 were produced in the same manner as that in Example 1 except that anhydrous maleic acid-modified EBR "Tafmer MH7020" (MFR=1.5 g/10 min. at 230° C.) manufactured by Mitsui Chemicals Inc. was used as a compatibilizer (C) and each pellet thereof was dry-blended so as to have a mixing ratio as listed in Tables 1 and 2. After that, injection molding was carried out in the same manner as that in Example 1 to prepare test pieces for Examples 5 to 18.

Comparative Example 1

A pellet of thermoplastic resin composition for Comparative Example 1 was produced in the same manner as that in Example 1 except that anhydrous maleic acid-modified PP "Umex 1001" (Mw=40,000, acid value=26) manufactured by Sanyo Chemical Ind., Ltd. was used as a compatibilizer (C) and each pellet thereof was dry-blended so as to have a mixing ratio as listed in Table 2. After that, injection molding was carried out in the same manner as that in Example 1 to prepare a test piece for Comparative Example 1.

Comparative Example 2

A pellet of thermoplastic resin composition for Comparative Example 2 was produced in the same manner as that in Example 1 except that non-modified EPR "Tafmer P-0680" (MFR=0.7 g/10 min. at 230° C.) manufactured by Mitsui Chemicals Inc. was used as a compatibilizer (C) and each pellet thereof was dry-blended so as to have a mixing ratio as listed in Table 2. After that, injection molding was carried out in the same manner as that in Example 1 to prepare a test piece for Comparative Example 2.

Comparative Example 3

A pellet of thermoplastic resin composition for Comparative Example 3 was produced in the same manner as that in Example 1 except that non-modified EBR "Tafmer A-1070S" (MFR=2.2 g/10 min. at 230° C.) manufactured by Mitsui Chemicals Inc. was used as a compatibilizer (C) and each pellet thereof was dry-blended so as to have a mixing ratio as listed in Table 2. After that, injection molding was carried out in the same manner as that in Example 1 to prepare a test piece for Comparative Example 3.

Comparative Example 4

A pellet of thermoplastic resin composition for Comparative Example 4 was produced in the same manner as that in Example 1 except that unmodified SEBS "Tuftec H1041" (MFR=5 g/10 min. at 230° C.) manufactured by Asahi Kasei Chemicals Corp. was used as a compatibilizer (C) and each pellet thereof was dry-blended so as to have a mixing ratio as listed in Table 2. After that, injection molding was carried out in the same manner as that in Example 1 to prepare a test piece for Comparative Example 4.

Comparative Example 5

A polypropylene resin "Novatec MA1B" (homopolymer, Mw=312,000, mp=165° C.) manufactured by Japan Polypropylene Corp. as a polyolefin resin was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Comparative Example 5 (see Table 2). Subsequently, injection molding was carried out in the same manner as that in Example 1 to prepare a test piece for Comparative Example 5.

TABLE 1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Mixing ratio (% by mass) | (A) Polyamide (PA 11) | | 20 | 20 | 20 | 20 | 5 | 10 | 25 | 30 | 40 | 50 | 60 | 70 |
| | (B) Polyolefin | | 70 | 70 | 70 | 70 | 85 | 80 | 65 | 60 | 50 | 40 | 30 | 20 |
| | (C) Compatibilizer | Anhydrous maleic acid-modified EPR | 10 | — | — | — | — | — | — | — | — | — | — | — |
| | | Anhydrous maleic acid-modified EBR ("Tafmer MH7020") | — | 10 | — | — | 10 | 10 | 10 | 10 | 10 | 10 | 10 | 10 |
| | | Anhydrous maleic acid-modified SEBS | — | — | 10 | — | — | — | — | — | — | — | — | — |
| | | Anhydrous maleic acid-modified EOR | — | — | — | 10 | — | — | — | — | — | — | — | — |
| | | Anhydrous maleic acid-modified PP | — | — | — | — | — | — | — | — | — | — | — | — |
| | | Unmodified EPR | — | — | — | — | — | — | — | — | — | — | — | — |
| | | Unmodified EBR | — | — | — | — | — | — | — | — | — | — | — | — |
| | | Unmodified SEBS | — | — | — | — | — | — | — | — | — | — | — | — |

TABLE 2

| | | | Example | | | | | | Comparative Example | | | | |
|---|---|---|---|---|---|---|---|---|---|---|---|---|---|
| | | | 13 | 14 | 15 | 16 | 17 | 18 | 1 | 2 | 3 | 4 | 5 |
| Mixing ratio (% by mass) | (A) Polyamide (PA11) | | 80 | 60 | 60 | 60 | 25 | 25 | 20 | 20 | 20 | 20 | — |
| | (B) Polyolefin | | 10 | 35 | 25 | 20 | 60 | 55 | 70 | 70 | 70 | 70 | 100 |
| | (C) Compatibilizer | Anhydrous maleic acid-modified EPR | — | — | — | — | — | — | — | — | — | — | — |
| | | Anhydrous maleic acid-modified EBR ("TAFMER MH7020") | 10 | 5 | 15 | 20 | 15 | 20 | — | — | — | — | — |
| | | Anhydrous maleic acid-modified SEBS | — | — | — | — | — | — | — | — | — | — | — |
| | | Anhydrous maleic acid-modified EOR | — | — | — | — | — | — | — | — | — | — | — |
| | | Anhydrous maleic acid-modified PP | — | — | — | — | — | — | 10 | — | — | — | — |
| | | Unmodified EPR | — | — | — | — | — | — | — | 10 | — | — | — |
| | | Unmodified EBR | — | — | — | — | — | — | — | — | 10 | — | — |
| | | Unmodified SEBS | — | — | — | — | — | — | — | — | — | 10 | — |

[1-2] Evaluation of Thermoplastic Resin Composition (I)

Examples 1 to 18 and Comparative Examples 1 to 5

(1) Measurement of Charpy Impact Strength

Test pieces for evaluation obtained in Examples 1 to 18 and Comparative Examples 1 to 5 of the above section [1-1] were subjected to measurement in accordance with JIS K7111-1 for Charpy impact strength. Results thereof were shown in Table 3, FIG. 1 (Examples 1 to 4 and Comparative Examples 1 to 4), and FIG. 2 (Examples 1 to 4 and Comparative Examples 1 to 4). In the measurement of Charpy impact strength, the impact strength was measured by an edgewise test method at a temperature of 23° C. with a test piece having notch (type A).

(2) Measurement of Flexural Modulus

Test pieces for evaluation obtained in Examples 1 to 18 and Comparative Examples 1 to 5 of the above section [1-1] were subjected to measurement in accordance with JIS K7171 for flexural modulus. Results thereof were shown in Table 3. The flexural modulus was measured by supporting each of test pieces at two points (radius of curvature: 5 mm) with a distance L of 64 mm therebetween while applying a load at a speed of 2 mm/min from an action point (radius of curvature: 5 mm) positioned in the middle of the two points.

(3) Observation of Morphology

A fracture surface of the test piece according to Example 2 provided for the measurement of Charpy impact strength in the above item (1) of the section [1-2] was observed with a scanning electron microscope (manufactured by JEOL Ltd.) by fifty hundred magnification. The image was shown in FIG. 3.

TABLE 3

| | | Charpy impact strength (kJ/m$^2$) | Flexural modulus (MPa) |
|---|---|---|---|
| Example | 1 | 6.5 | 1238 |
| | 2 | 10.1 | 1241 |
| | 3 | 7.0 | 1199 |
| | 4 | 9.2 | 1117 |
| | 5 | 6.6 | 1078 |
| | 6 | 8.0 | 1046 |
| | 7 | 8.8 | 1184 |
| | 8 | 9.5 | 1182 |
| | 9 | 10.3 | 1148 |
| | 10 | 18.2 | 1062 |
| | 11 | 62.0 | 946 |
| | 12 | 25.6 | 927 |
| | 13 | 72.1 | 866 |
| | 14 | 6.4 | 1211 |
| | 15 | 80.0 | 852 |
| | 16 | 86.3 | 710 |
| | 17 | 17.9 | 952 |
| | 18 | 72.9 | 775 |
| Comparative Example | 1 | 1.4 | 1386 |
| | 2 | 2.7 | 1251 |
| | 3 | 4.2 | 1352 |
| | 4 | 2.8 | 1309 |
| | 5 | 2.48 | 1476 |

[1-3] Effects of Examples 1 to 18

According to the results in Table 3, Comparative Examples 1 to 4 in which the modified polypropylene or the unmodified elastomer was used as the compatibilizer had flexural moduli of 1,251 to 1,386 MPa, but Charpy impact strengths were as low as 1.4 to 4.2 kJ/m$^2$. Comparative Example 5 in which the polyamide resin and the compatibilizer were not used had flexural modulus of 1,476 MPa, but Charpy impact strengths were as low as 2.48 kJ/m$^2$.

On the other hand, Examples 1 to 18 in which the modified elastomer was used as the compatibilizer had flexural moduli of 710 to 1,241 MPa, and Charpy impact strengths of 6.4 to 86.3 kJ/m$^2$. It was found that Examples 1 to 18 were excellent in impact strength as well as rigidity.

Clearly from the results in FIG. 1 and Table 3, it was confirmed that impact strength could be improved while maintaining sufficient rigidity when an elastomer was modified.

Specifically, while Charpy impact strength achieved by Comparative Example 2 in which unmodified EPR was used as the compatibilizer was 2.7 kJ/m$^2$, Charpy impact strength achieved by Example 1 in which anhydrous maleic acid-modified EPR was used as the compatibilizer was 6.5 kJ/m$^2$. A significantly improvement in impact strength was obtained. Additionally, while Charpy impact strength achieved by Comparative Example 3 in which unmodified EBR was used as the compatibilizer was 4.2 kJ/m$^2$, Charpy impact strength achieved by Example 2 in which anhydrous maleic acid-modified EBR was used as the compatibilizer was 10.1 kJ/m$^2$. A significantly improvement in impact strength was obtained. Moreover, while Charpy impact strength achieved by Comparative Example 4 in which unmodified SEBS was used as the compatibilizer was 2.8 kJ/m$^2$, Charpy impact strength achieved by Example 3 in which anhydrous maleic acid-modified SEBS was used as the compatibilizer was 7 kJ/m$^2$. A significantly improvement in impact strength was obtained.

Figure 2:
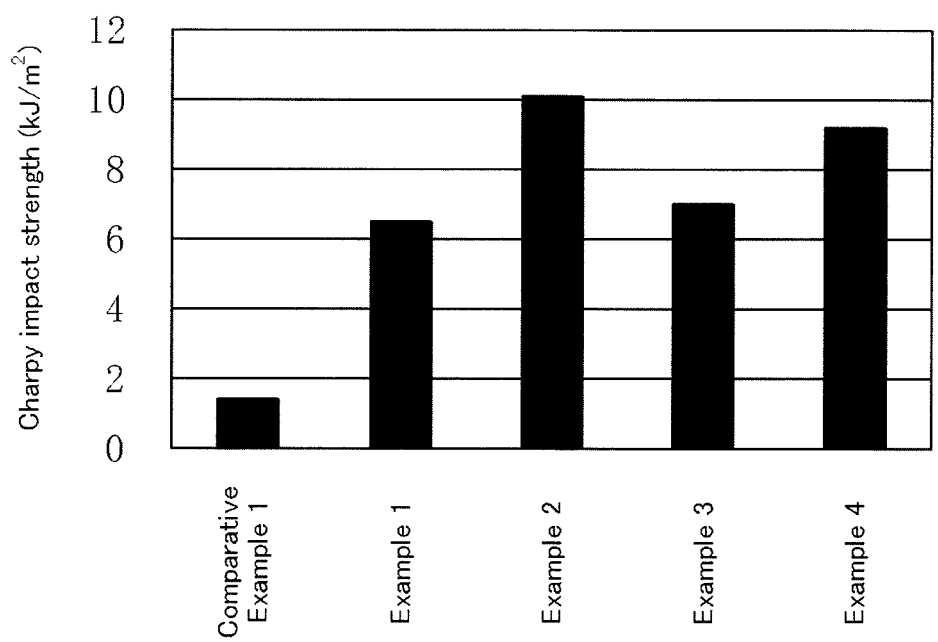
FIG. 2 is a graph relating to Charpy impact strength.

Furthermore, clearly from the results in FIG. 2 and Table 3, it was confirmed that impact strength could be improved while maintaining sufficient rigidity by utilizing a modified elastomer as the compatibilizer.

Specifically, while Charpy impact strength achieved by Comparative Example 1 in which the modified polypropylene was used as the compatibilizer was 1.4 kJ/m$^2$, Charpy impact strengths achieved by Examples 1 to 4 in which the modified elastomer was used as the compatibilizer were 6.5 to 10.1 kJ/m$^2$. A significantly improvement in impact strength was obtained.

Figure 3:
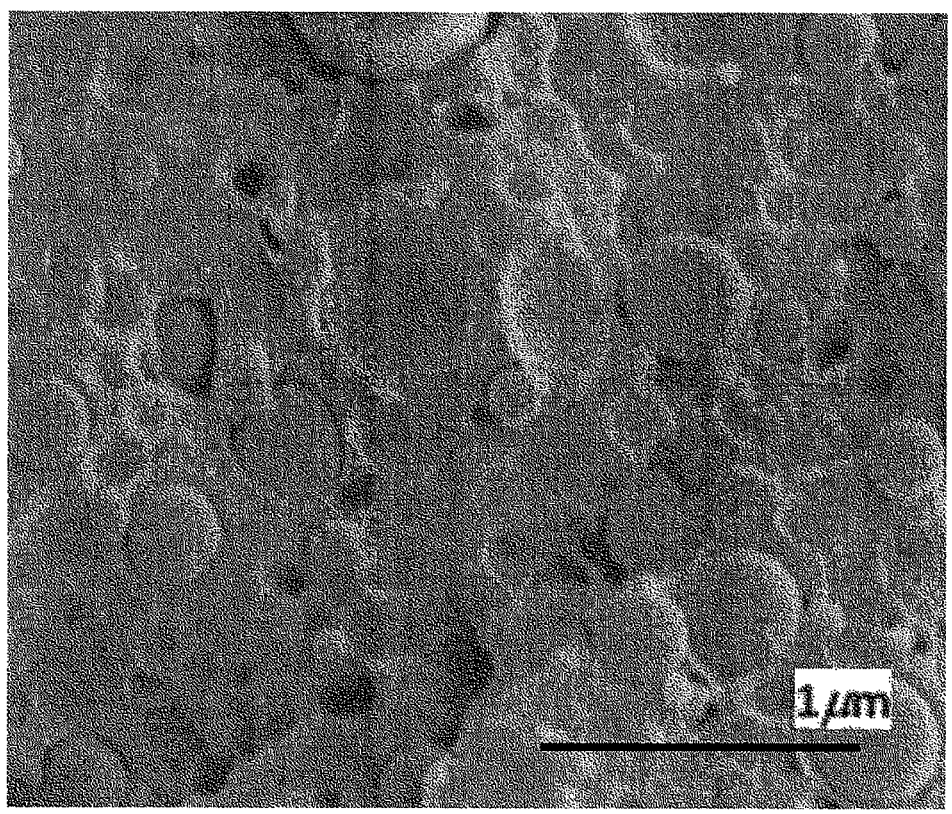
FIG. 3 is an explanatory view illustrating a resin dispersion state observed using an SEM.

Additionally, the result in FIG. 3 shows that the test piece of Example 2 had a sea-island structure. The majority of the island phase (i.e., polyamide resin as dispersed phase) was micro-dispersed in the sea phase (i.e., polypropylene resin as matrix phase) to have an average particle size of about 800 nm. Therefore, it is considered that the structure obtained by utilizing the specific compatibilizer effectively improved impact strength and rigidity.

[1-4] Production of Thermoplastic Resin Composition (I) Using Resin Other than PA11 as Polyamide Resin, and Making of Test Piece

Example 19

(1) Preparation of Mixed Resin

PA6 "1010X1" (nylon 6 resin, mp=225° C.) manufactured by Ube Ind., Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 260° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 260° C., an extrusion speed at 2.0 kg/hr, and the number of screw revolution at 200 rpm. An extruded thermoplastic resin composition was then cut using a pelletizer so as to prepare a thermoplastic resin composition pellet for Example 19.

After that, the resulting thermoplastic resin composition pellet for Example 19 was put into a hopper of an injection molding machine (40-ton injection molding machine) manufactured by Nissei Plastic Ind., Co., Ltd., to prepare a test piece for evaluation under conditions of a set temperature at 260° C. and a mold temperature at 60° C.

Examples 20 to 24

Pellets of thermoplastic resin compositions for Examples 20 to 24 were produced in the same manner as that in Example 19 except that compatibilizers (C) shown below were used and each pellet thereof was dry-blended so as to have a mixing ratio as listed in Table 4. After that, injection molding was carried out in the same manner as that in Example 19 to prepare test pieces for Examples 20 to 24.

The compatibilizers (C) used in Examples 20 to 24 are as follows.

Example 20 anhydrous maleic acid-modified EBR "Tafmer MA8510" manufactured by Mitsui Chemicals Inc. (MFR=5.0 g/10 min. at 230° C.)

Example 21 anhydrous maleic acid-modified EBR "Tafmer MA7010" manufactured by Mitsui Chemicals Inc. (MFR=1.8 g/10 min. at 230° C.)

Example 22 anhydrous maleic acid-modified EBR "Tafmer MH7020" manufactured by Mitsui Chemicals Inc. (MFR=1.5 g/10 min. at 230° C.)

Example 23 anhydrous maleic acid-modified EBR "Tafmer MH5040" manufactured by Mitsui Chemicals Inc. (MFR=1.1 g/10 min. at 230° C.)

Example 24 anhydrous maleic acid-modified EOR "AMPLIFY GR216" manufactured by The Dow Chemical Company (Mw=150,000, maleic anhydride content: 0.8 wt %)

Comparative Example 6

PA6 "1010X1" (nylon 6 resin, mp=225° C.) manufactured by Ube Ind., Ltd. was used as a polyamide resin (A). A polypropylene resin "Novatec MA1B" (homopolymer, Mw=312,000, mp=165° C.) manufactured by Japan Polypropylene Corp. as a polyolefin resin (B). Each resin was dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 260° C., an extrusion speed at 2.0 kg/hr, and the number of screw revolution at 200 rpm. An extruded thermoplastic resin composition was then cut using a pelletizer so as to prepare a thermoplastic resin composition pellet for Comparative Example 6.

After that, the resulting thermoplastic resin composition pellet for Comparative Example 6 was put into a hopper of an injection molding machine (40-ton injection molding machine) manufactured by Nissei Plastic Ind., Co., Ltd., to prepare a test piece for evaluation under conditions of a set temperature at 260° C. and a mold temperature at 60° C.

Example 25

(1) Preparation of Mixed Resin

PA12 "Rilsan AECN OTL" (nylon 12 resin, mp=174-178° C.) manufactured by ARKEMA K.K. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 5. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 5. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Example 25.

After that, the resulting thermoplastic resin composition pellet for Example 25 was put into a hopper of an injection molding machine (40-ton injection molding machine) manufactured by Nissei Plastic Ind., Co., Ltd., to prepare a test piece for evaluation under conditions of a set temperature at 210° C. and a mold temperature at 60° C.

Example 26

A pellet of a thermoplastic resin composition for Example 26 was produced in the same manner as that in Example 25 except that each pellet was dry-blended so as to have a mixing ratio as listed in Table 5. Then, injection molding was carried out in the same manner as that in Example 25 to prepare a test piece for Example 26.

Comparative Example 7

PA12 "Rilsan AECN OTL" (nylon 12 resin, mp=174-178° C.) manufactured by ARKEMA K.K. as a polyamide resin (A) was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Comparative Example 7 (see Table 5). Then, injection molding was carried out in the same manner as that in Example 25 to prepare a test piece for Comparative Example 7.

Example 27

(1) Preparation of Mixed Resin

PA610 "Vestamid Terra HS16" (nylon 610 resin, mp=222° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 6. Subsequently, the mixture was charged into a twin screw kneading extruder (screw diameter=25 mm, L/D=41) manufactured by Parker Corp., Inc. and mixed therein under conditions of a kneading temperature at 235° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 6. Subsequently, the mixture was charged into a twin screw kneading extruder (screw diameter=25 mm, L/D=41) manufactured by Parker Corp., Inc. and mixed therein under conditions of a kneading temperature at 235° C., an extrusion speed at 3.0 kg/hr, and the number of screw revolution at 200 rpm. An extruded thermoplastic resin composition was then cut using a pelletizer so as to prepare a thermoplastic resin composition pellet for Example 27.

After that, the resulting thermoplastic resin composition pellet for Example 27 was put into a hopper of an injection molding machine (40-ton injection molding machine) manufactured by Nissei Plastic Ind., Co., Ltd., to prepare a test piece for evaluation under conditions of a set temperature at 235° C. and a mold temperature at 60° C.

Examples 28 to 32

Pellets of thermoplastic resin compositions for Examples 28 to 32 were produced in the same manner as that in Example 27 except that each pellet was dry-blended so as to have a mixing ratio as listed in Table 6. Then, injection molding was carried out in the same manner as that in Example 27 to prepare test pieces for Example 28 to 32.

Comparative Example 8

PA610 "Vestamid Terra HS16" (nylon 610 resin, mp=222° C.) manufactured by Daicel-Evonik Ltd. was used as a polyamide resin (A). A polypropylene resin "Novatec MA1B" (homopolymer, Mw=312,000, mp=165° C.) manufactured by Japan Polypropylene Corp. as a polyolefin resin (B). Each resin was dry-blended so as to have a mixing ratio as listed in Table 6. Subsequently, the mixture was charged into a twin screw kneading extruder (screw diameter=25 mm, L/D=41) manufactured by Parker Corp., Inc., and mixed therein under conditions of a kneading temperature at 235° C., an extrusion speed at 3.0 kg/hr, and the number of screw revolution at 200 rpm. An extruded thermoplastic resin composition was then cut using a pelletizer so as to prepare a thermoplastic resin composition pellet for Comparative Example 8.

After that, the resulting thermoplastic resin composition pellet for Comparative Example 8 was put into a hopper of an injection molding machine (40-ton injection molding machine) manufactured by Nissei Plastic Ind., Co., Ltd., to prepare a test piece for evaluation under conditions of a set temperature at 235° C. and a mold temperature at 60° C.

Example 33

(1) Preparation of Mixed Resin

PA1010 "Vestamid Terra DS16" (nylon 1010 resin, mp=206° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 7. Subsequently, the mixture was charged into a twin screw kneading extruder (screw diameter=25 mm, L/D=41) manufactured by Parker Corp., Inc. and mixed therein under conditions of a kneading temperature at 250° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 7. Subsequently, the mixture was charged into a twin screw kneading extruder (screw diameter=25 mm, L/D=41) manufactured by Parker Corp., Inc. and mixed therein under conditions of a kneading temperature at 250° C., an extrusion speed at 3.0 kg/hr, and the number of screw revolution at 200 rpm. An extruded thermoplastic resin composition was then cut using a pelletizer so as to prepare a thermoplastic resin composition pellet for Example 33.

After that, the resulting thermoplastic resin composition pellet for Example 33 was put into a hopper of an injection molding machine (40-ton injection molding machine) manufactured by Nissei Plastic Ind., Co., Ltd., to prepare a test piece for evaluation under conditions of a set temperature at 250° C. and a mold temperature at 60° C.

Examples 34 to 38

Pellets of thermoplastic resin compositions for Examples 34 to 38 were produced in the same manner as that in Example 33 except that each pellet was dry-blended so as to have a mixing ratio as listed in Table 7. Then, injection molding was carried out in the same manner as that in Example 33 to prepare test pieces for Example 34 to 38.

Comparative Example 9

PA1010 "Vestamid Terra DS16" (nylon 1010 resin, mp=206° C.) manufactured by Daicel-Evonik Ltd. was used as a polyamide resin (A). A polypropylene resin "Novatec MA1B" (homopolymer, Mw=312,000, mp=165° C.) manufactured by Japan Polypropylene Corp. as a polyolefin resin (B). Each resin was dry-blended so as to have a mixing ratio as listed in Table 7. Subsequently, the mixture was charged into a twin screw kneading extruder (screw diameter=25 mm, L/D=41) manufactured by Parker Corp., Inc., and mixed therein under conditions of a kneading temperature at 250° C., an extrusion speed at 3.0 kg/hr, and the number of screw revolution at 200 rpm. An extruded thermoplastic resin composition was then cut using a pelletizer so as to prepare a thermoplastic resin composition pellet for Comparative Example 9.

After that, the resulting thermoplastic resin composition pellet for Comparative Example 9 was put into a hopper of an injection molding machine (40-ton injection molding machine) manufactured by Nissei Plastic Ind., Co., Ltd., to prepare a test piece for evaluation under conditions of a set temperature at 250° C. and a mold temperature at 60° C.

Example 39

(1) Preparation of Mixed Resin

PAMXD6 "Reny 6002" (nylon MXD6 resin, mp=243° C.) manufactured by Mitsubishi Engineering-Plastics Corp. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 8. Subsequently, the mixture was charged into a twin screw kneading extruder (screw diameter=25 mm, L/D=41) manufactured by Parker Corp., Inc. and mixed therein under conditions of a kneading temperature at 265° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 8. Subsequently, the mixture was charged into a twin screw kneading extruder (screw diameter=25 mm, L/D=41) manufactured by Parker Corp., Inc. and mixed therein under conditions of a kneading temperature at 265° C., an extrusion speed at 3.0 kg/hr, and the number of screw revolution at 200 rpm. An extruded thermoplastic resin composition was then cut using a pelletizer so as to prepare a thermoplastic resin composition pellet for Example 39.

After that, the resulting thermoplastic resin composition pellet for Example 39 was put into a hopper of an injection molding machine (40-ton injection molding machine) manufactured by Nissei Plastic Ind., Co., Ltd., to prepare a test piece for evaluation under conditions of a set temperature at 265° C. and a mold temperature at 90° C.

Examples 40 to 44

Pellets of thermoplastic resin compositions for Examples 40 to 44 were produced in the same manner as that in Example 39 except that each pellet was dry-blended so as to have a mixing ratio as listed in Table 8. Then, injection molding was carried out in the same manner as that in Example 39 to prepare test pieces for Example 40 to 44.

Comparative Example 10

PAMXD6 "Reny 6002" (nylon MXD6 resin, mp=243° C.) manufactured by Mitsubishi Engineering-Plastics Corp. was used as a polyamide resin (A). A polypropylene resin "Novatec MA1B" (homopolymer, Mw=312,000, mp=165° C.) manufactured by Japan Polypropylene Corp. as a polyolefin resin (B). Each resin was dry-blended so as to have a mixing ratio as listed in Table 8. Subsequently, the mixture was charged into a twin screw kneading extruder (screw diameter=25 mm, L/D=41) manufactured by Parker Corp., Inc., and mixed therein under conditions of a kneading temperature at 265° C., an extrusion speed at 3.0 kg/hr, and the number of screw revolution at 200 rpm. An extruded thermoplastic resin composition was then cut using a pelletizer so as to prepare a thermoplastic resin composition pellet for Comparative Example 10.

After that, the resulting thermoplastic resin composition pellet for Comparative Example 10 was put into a hopper of an injection molding machine (40-ton injection molding machine) manufactured by Nissei Plastic Ind., Co., Ltd., to prepare a test piece for evaluation under conditions of a set temperature at 265° C. and a mold temperature at 90° C.

Example 45

(1) Preparation of Mixed Resin

PA10T "Vestamid HT Plus M300" (nylon 10T resin, mp=285° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 9. Subsequently, the mixture was charged into a twin screw kneading extruder (screw diameter=25 mm, L/D=41) manufactured by Parker Corp., Inc. and mixed therein under conditions of a kneading temperature at 310° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 9. Subsequently, the mixture was charged into a twin screw kneading extruder (screw diameter=25 mm, L/D=41) manufactured by Parker Corp., Inc. and mixed therein under conditions of a kneading temperature at 310° C., an extrusion speed at 3.0 kg/hr, and the number of screw revolution at 200 rpm. An extruded thermoplastic resin composition was then cut using a pelletizer so as to prepare a thermoplastic resin composition pellet for Example 45.

After that, the resulting thermoplastic resin composition pellet for Example 45 was put into a hopper of an injection molding machine (40-ton injection molding machine) manufactured by Nissei Plastic Ind., Co., Ltd., to prepare a test piece for evaluation under conditions of a set temperature at 310° C. and a mold temperature at 90° C.

Examples 46 and 47

Pellets of thermoplastic resin compositions for Examples 46 and 47 were produced in the same manner as that in Example 45 except that each pellet was dry-blended so as to have a mixing ratio as listed in Table 9. Then, injection molding was carried out in the same manner as that in Example 45 to prepare test pieces for Example 46 and 47.

Comparative Example 11

PA10T "Vestamid HT Plus M300" (nylon 10T resin, mp=285° C.) manufactured by Daicel-Evonik Ltd. was used as a polyamide resin (A). A polypropylene resin "Novatec MA1B" (homopolymer, Mw=312,000, mp=165° C.) manufactured by Japan Polypropylene Corp. as a polyolefin resin (B). Each resin was dry-blended so as to have a mixing ratio as listed in Table 9. Subsequently, the mixture was charged into a twin screw kneading extruder (screw diameter=25 mm, L/D=41) manufactured by Parker Corp., Inc., and mixed therein under conditions of a kneading temperature at 310° C., an extrusion speed at 3.0 kg/hr, and the number of screw revolution at 200 rpm. An extruded thermoplastic resin composition was then cut using a pelletizer so as to prepare a thermoplastic resin composition pellet for Comparative Example 11.

After that, the resulting thermoplastic resin composition pellet for Comparative Example 11 was put into a hopper of an injection molding machine (40-ton injection molding machine) manufactured by Nissei Plastic Ind., Co., Ltd., to prepare a test piece for evaluation under conditions of a set temperature at 310° C. and a mold temperature at 90° C.

TABLE 4

| | | | Example | | | | | | Comparative Example |
|---|---|---|---|---|---|---|---|---|---|
| | | | 19 | 20 | 21 | 22 | 23 | 24 | 6 |
| Mixing ratio (% by mass) | (A) | Polyamide (PA6) | 25 | 60 | 60 | 60 | 60 | 60 | 67 |
| | (B) | Polyolefin | 65 | 30 | 30 | 30 | 30 | 30 | 33 |
| | (C) Compatibilizer | Anhydrous maleic acid-modified EBR ("Tafmer MA8510") | — | 10 | — | — | — | — | — |
| | | Anhydrous maleic acid-modified EBR ("Tafmer MH7010") | — | — | 10 | — | — | — | — |
| | | Anhydrous maleic acid-modified EBR ("Tafmer MH7020") | 10 | — | — | 10 | — | — | — |
| | | Anhydrous maleic acid-modified EBR ("Tafmer MH5040") | — | — | — | — | 10 | — | — |
| | | Anhydrous maleic acid-modified EOR | — | — | — | — | — | 10 | — |
| Charpy impact strength (kJ/m$^2$) | | | 8.5 | 3.9 | 5.2 | 11.9 | 16.6 | 7.3 | 2.3 |
| Flexural modulus (MPa) | | | 1401 | 1467 | 1449 | 1401 | 1325 | 1392 | 2022 |

TABLE 5

| | | Example | | Comparative Example |
|---|---|---|---|---|
| | | 25 | 26 | 7 |
| Mixing ratio (% by mass) | (A) Polyamide (PA12) | 25 | 30 | 100 |
| | (B) Polyolefin | 65 | 60 | — |
| | (C) Compatibilizer (Anhydrous maleic acid-modified EBR "Tafmer MH7020") | 10 | 10 | — |
| Charpy impact strength (kJ/m$^2$) | | 7.7 | 12.8 | 2.8 |
| Flexural modulus (MPa) | | 1434 | 1253 | 1340 |

TABLE 6

| | | Example | | | | | | Comparative Example |
|---|---|---|---|---|---|---|---|---|
| | | 27 | 28 | 29 | 30 | 31 | 32 | 8 |
| Mixing ratio | (A) Polyamide (PA610) | 25 | 25 | 25 | 40 | 55 | 70 | 28 |
| | (B) Polyolefin | 65 | 55 | 45 | 50 | 35 | 20 | 72 |

TABLE 6-continued

|  |  | Example | | | | | | Comparative Example |
|---|---|---|---|---|---|---|---|---|
|  |  | 27 | 28 | 29 | 30 | 31 | 32 | 8 |
| (% by mass) | (C) Compatibilizer (Anhydrous maleic acid-modified EBR "Tafmer MH7020") | 10 | 20 | 30 | 10 | 10 | 10 | — |
|  | Charpy impact strength (kJ/m²) | 5.4 | 14.0 | 40.0 | 8.6 | 9.1 | 8.3 | 2.1 |
|  | Flexural modulus (MPa) | 1390 | 930 | 660 | 1370 | 1360 | 1380 | 1730 |

TABLE 7

|  |  | Example | | | | | | Comparative Example |
|---|---|---|---|---|---|---|---|---|
|  |  | 33 | 34 | 35 | 36 | 37 | 38 | 9 |
| Mixing ratio (% by mass) | (A) Polyamide (PA1010) | 25 | 25 | 25 | 40 | 55 | 70 | 28 |
|  | (B) Polyolefin | 65 | 55 | 45 | 50 | 35 | 20 | 72 |
|  | (C) Compatibilizer (Anhydrous maleic acid-modified EBR "Tafmer MH7020") | 10 | 20 | 30 | 10 | 10 | 10 | — |
|  | Charpy impact strength (kJ/m²) | 3.0 | 15.4 | 40.0 | 2.1 | 4.8 | 8.1 | 1.1 |
|  | Flexural modulus (MPa) | 1230 | 880 | 550 | 1350 | 1340 | 1320 | 1650 |

TABLE 8

|  |  | Example | | | | | | Comparative Example |
|---|---|---|---|---|---|---|---|---|
|  |  | 39 | 40 | 41 | 42 | 43 | 44 | 10 |
| Mixing ratio (% by mass) | (A) Polyamide (PAMXD6) | 25 | 25 | 25 | 40 | 55 | 70 | 28 |
|  | (B) Polyolefin | 65 | 55 | 45 | 50 | 35 | 20 | 72 |
|  | (C) Compatibilizer (Anhydrous maleic acid-modified EBR "Tafmer MH7020") | 10 | 20 | 30 | 10 | 10 | 10 | — |
|  | Charpy impact strength (kJ/m²) | 3.0 | 13.6 | 56.0 | 2.2 | 2.6 | 4.9 | 1.1 |
|  | Flexural modulus (MPa) | 1650 | 1010 | 820 | 1930 | 2290 | 2640 | 2270 |

TABLE 9

|  |  | Example | | | Comparative Example |
|---|---|---|---|---|---|
|  |  | 45 | 46 | 47 | 11 |
| Mixing ratio (% by mass) | (A) Polyamide (PA10T) | 25 | 45 | 60 | 28 |
|  | (B) Polyolefin | 55 | 45 | 30 | 72 |
|  | (C) Compatibilizer (Anhydrous maleic acid-modified EBR "Tafmer MH7020") | 20 | 10 | 10 | — |
|  | Charpy impact strength (kJ/m²) | 5.0 | 2.1 | 3.8 | 1.1 |
|  | Flexural modulus (MPa) | 910 | 1590 | 1620 | 1860 |

[1-5] Evaluation of Thermoplastic Resin Composition (I)

Examples 19 to 47 and Comparative Examples 6 to 11

Test pieces for evaluation obtained in Examples 19 to 47 and Comparative Examples 6 to 11 of the above section [1-4] were subjected to measurement for Charpy impact strength and flexural modulus according to the same method as the above section [1-2]. Results thereof were shown in Tables 4 to 9.

[1-6] Effects of Examples 19 to 47

According to the results in Table 4, Comparative Example 6 in which PA6 was used as the polyamide and the compatibilizer was not used had flexural modulus of 2,022 MPa, but Charpy impact strength was as low as 2.3 kJ/m².

On the other hand, Examples 19 to 24 in which PA6 was used as the polyamide and the modified elastomer was used as the compatibilizer had flexural moduli of 1,325 to 1,467 MPa, and Charpy impact strengths of 3.9 to 16.6 kJ/m². It was found that Examples 19 to 24 were excellent in impact strength as well as rigidity.

According to the results in Table 5, Comparative Example 7 in which PA12 was used as the polyamide and the polyolefin and the compatibilizer were not used had flexural modulus of 1,340 MPa, but Charpy impact strength was as low as 2.8 kJ/m².

On the other hand, Examples 25 and 26 in which PA12 was used as the polyamide and the modified elastomer was used as the compatibilizer had flexural moduli of 1,253 to 1,434 MPa, and Charpy impact strengths of 7.7 to 12.8 kJ/m$^2$. It was found that Examples 25 and 26 were excellent in impact strength as well as rigidity.

According to the results in Table 6, Comparative Example 8 in which PA610 was used as the polyamide and the compatibilizer was not used had flexural modulus of 1,730 MPa, but Charpy impact strength was as low as 2.1 kJ/m$^2$.

On the other hand, Examples 27 to 32 in which PA610 was used as the polyamide and the modified elastomer was used as the compatibilizer had flexural moduli of 660 to 1,390 MPa, and Charpy impact strengths of 5.4 to 40.0 kJ/m$^2$. It was found that Examples 27 to 32 were excellent in impact strength as well as rigidity.

According to the results in Table 7, Comparative Example 9 in which PA1010 was used as the polyamide and the compatibilizer was not used had flexural modulus of 1,650 MPa, but Charpy impact strength was as low as 1.1 kJ/m$^2$.

On the other hand, Examples 33 to 38 in which PA1010 was used as the polyamide, and the modified elastomer was used as the compatibilizer had flexural moduli of 550 to 1,350 MPa, and Charpy impact strengths of 2.1 to 40.0 kJ/m$^2$. It was found that Examples 33 to 38 were excellent in impact strength as well as rigidity.

According to the results in Table 8, Comparative Example 10 in which PAMXD6 was used as the polyamide and the compatibilizer was not used had flexural modulus of 2,270 MPa, but Charpy impact strength was as low as 1.1 kJ/m$^2$.

On the other hand, Examples 39 to 44 in which PAMXD6 was used as the polyamide and the modified elastomer was used as the compatibilizer had flexural moduli of 820 to 2,640 MPa, and Charpy impact strengths of 2.2 to 56.0 kJ/m$^2$. It was found that Examples 39 to 44 were excellent in impact strength as well as rigidity.

According to the results in Table 9, Comparative Example 11 in which PA10T was used as the polyamide and the compatibilizer was not used had flexural modulus of 1,860 MPa, but Charpy impact strength was low as low as 1.1 kJ/m$^2$.

On the other hand, Examples 45 to 47 in which PA10T was used as the polyamide and the modified elastomer was used as the compatibilizer had flexural moduli of 910 to 1,620 MPa, and Charpy impact strengths of 2.1 to 5.0 kJ/m$^2$. It was found that Examples 45 to 47 were excellent in impact strength as well as rigidity.

[2-1] Production of Thermoplastic Resin Composition (II) Using PA11 as Polyamide Resin, and Making of Test Piece Experimental Examples 1 to 18

Inventive Product

PA11 "Rilsan BMN O" (nylon 11 resin, Mw=18,000) manufactured by ARKEMA K.K. was used as a polyamide resin (A). Anhydrous maleic acid-modified ethylene butene copolymer (c1) (modified EBR) "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 10 or Table 11. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin of polyamide resin (A) and compatibilizer (C).

The resulting mixed resin and a polypropylene resin "Novatec MA1B" (homopolymer, Mw=312,000, mp=165° C.) manufactured by Japan Polypropylene Corp. as a polyolefin resin (B) were dry-blended so as to have a mixing ratio as listed in Table 10 or Table 11. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded composition was then cut using a pelletizer so as to prepare a thermoplastic resin composition pellet containing a plant-derived polyamide resin for Experimental Examples 1 to 18.

After that, the resulting composition pellet for Experimental Examples 1 to 18 was put into a hopper of an injection molding machine (40-ton injection molding machine) manufactured by Nissei Plastic Ind., Co., Ltd., to prepare a test piece of a thermoplastic resin composition pellet containing a plant-derived polyamide resin for Experimental Examples 1 to 18 for evaluation under conditions of a set temperature at 210° C. and a mold temperature at 60° C.

Experimental Example 19

Inventive Product

A pellet of thermoplastic resin composition containing a plant-derived polyamide resin for Experimental Example 19 was produced in the same manner as that in Experimental Examples 1 to 18 except that anhydrous maleic acid-modified propylene butene copolymer (c2) (modified EPR) "Tafmer MP0620" (MFR=0.3 g/10 min. at 230° C.) manufactured by Mitsui Chemicals Inc. was used as a compatibilizer (C). After that, a test piece of a thermoplastic resin composition containing a plant-derived polyamide resin for Experimental Example 19 was prepared in the same manner as that in Experimental Examples 1 to 18.

Experimental Example 20

Inventive Product

A polypropylene resin "Novatec MA1B" (homopolymer, Mw=312,000, mp=165° C.) manufactured by Japan Polypropylene Corp. was used as a polyolefin resin (B). Anhydrous maleic acid-modified propylene butene copolymer (c2) (modified EPR) "Tafmer MP0620" (MFR=0.3 g/10 min. at 230° C.) manufactured by Mitsui Chemicals Inc. was used as a compatibilizer (C). Each pellet thereof was dry-blended so as to have a mixing ratio as listed in Table 11. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin of polyolefin resin (B) and compatibilizer (C).

The resulting mixed resin and PA11 "Rilsan BMN O" (nylon 11 resin, Mw=18,000) manufactured by ARKEMA K.K. as a polyamide resin (A) were dry-blended so as to have a mixing ratio as listed in Table 11. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded composition was then cut using a pelletizer so as to prepare a thermoplastic resin composition pellet containing a plant-derived polyamide resin for Experimental Example 20.

After that, the resulting composition pellet for Experimental Example 20 was put into a hopper of an injection molding machine (40-ton injection molding machine) manufactured by Nissei Plastic Ind., Co., Ltd., to prepare a test piece of a thermoplastic resin composition pellet containing a plant-derived polyamide resin for Experimental Example 20 for evaluation under conditions of a set temperature at 210° C. and a mold temperature at 60° C.

Experimental Example 21

Inventive Product

A pellet of thermoplastic resin composition containing a plant-derived polyamide resin for Experimental Example 21 was produced in the same manner as that in Experimental Examples 1 to 18 except that anhydrous maleic acid-modified ethylene octene copolymer (c3) (modified EOR) "AMPLIFY GR216" (Mw=150,000, anhydrous maleic acid-modified content: 0.8 wt %) manufactured by The Dow Chemical Company was used as a compatibilizer (C). After that, a test piece of a thermoplastic resin composition containing a plant-derived polyamide resin for Experimental Example 21 was prepared in the same manner as that in Experimental Examples 1 to 18.

TABLE 10

| | | | Experimental Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Mixing ratio (% by mass) | (A) Polyamide | PA11 | 1 | 5 | 10 | 20 | 25 | 30 | 40 | 50 | 60 | 70 | 80 |
| | (B) Polyolefin | PP | 89 | 85 | 80 | 70 | 65 | 60 | 50 | 40 | 30 | 20 | 10 |
| | (C) Compatibilizer | (c1) Modified EBR | 10 | 10 | 10 | 10 | 10 | 10 | 10 | 10 | 10 | 10 | 10 |
| | | (c2) Modified EPR | — | — | — | — | — | — | — | — | — | — | — |
| Mixing method | (B) was used after mixing (A) and (C) | | ○ | ○ | ○ | ○ | ○ | ○ | ○ | ○ | ○ | ○ | ○ |
| | (A) was used after mixing (B) and (C) | | — | — | — | — | — | — | — | — | — | — | — |
| Properties | Charpy impact strength (kJ/m$^2$) | | 3.7 | 6.6 | 8.0 | 10.1 | 8.8 | 9.5 | 10.3 | 18.2 | 62.0 | 25.6 | 72.1 |
| | Flexural modulus (MPa) | | 1105 | 1078 | 1046 | 1241 | 1184 | 1182 | 1148 | 1062 | 946 | 927 | 866 |
| | Specific gravity | | 0.90 | 0.90 | 0.91 | 0.92 | 0.93 | 0.94 | 0.95 | 0.96 | 0.98 | 0.99 | 1.00 |

TABLE 11

| | | | Experimental Example | | | | | | | | | | |
|---|---|---|---|---|---|---|---|---|---|---|---|---|---|
| | | | 12 | 9 | 13 | 14 | 15 | 16 | 17 | 18 | 19 | 20 | 21 |
| Mixing ratio (% by mass) | (A) Polyamide | PA11 | 60 | 60 | 60 | 60 | 25 | 25 | 25 | 25 | 20 | 20 | 20 |
| | (B) Polyolefin | PP | 35 | 30 | 25 | 20 | 70 | 60 | 55 | 45 | 70 | 70 | 70 |
| | (C) Compatibilizer | (c1) Modified EBR | 5 | 10 | 15 | 20 | 5 | 15 | 20 | 30 | — | — | — |
| | | (c2) Modified EPR | — | — | — | — | — | — | — | — | 10 | 10 | — |
| | | (c3) Modified EOR | — | — | — | — | — | — | — | — | — | — | 10 |
| Mixing method | (B) was used after mixing (A) and (C) | | ○ | ○ | ○ | ○ | ○ | ○ | ○ | ○ | ○ | — | ○ |
| | (A) was used after mixing (B) and (C) | | — | — | — | — | — | — | — | — | — | ○ | — |
| Properties | Charpy impact strength (kJ/m$^2$) | | 6.4 | 62.0 | 80.0 | 86.3 | 3.8 | 17.9 | 72.9 | 69.4 | 6.5 | 5.9 | 9.18 |
| | Flexural modulus (MPa) | | 1211 | 946 | 852 | 710 | 1275 | 952 | 775 | 453 | 1238 | 1114 | 1117 |
| | Specific gravity | | 0.98 | 0.98 | 0.97 | 0.97 | 0.93 | 0.93 | 0.93 | 0.92 | 0.92 | 0.92 | 0.92 |

[2-2] Evaluation of Thermoplastic Resin Composition (II)

(1) Measurement of Charpy Impact Strength

Test pieces for evaluation obtained in Experimental Examples 1 to 21 of the above section [2-1] were subjected to measurement in accordance with HS K7111-1 for Charpy impact strength. Results thereof were shown in Tables 10 and 11. In the measurement of Charpy impact strength, the impact was measured by an edgewise test method at a temperature of 23° C. with a test piece having notch (type A).

(2) Measurement of Flexural Modulus

Test pieces for evaluation obtained in Experimental Examples 1 to 21 of the above section [2-1] were subjected to measurement in accordance with JIS K7171 for flexural modulus. Results thereof were shown in Tables 10 and 11. The flexural modulus was measured by supporting each of test pieces at two points (radius of curvature: 5 mm) with a distance L of 64 mm therebetween while applying a load at a speed of 2 mm/min from an action point (radius of curvature: 5 mm) positioned in the middle of the two points.

[2-3] Measurement Results

Clearly from the results in Tables 10 and 11, Experimental Examples 1 to 21 had flexural moduli of 453 to 1,275 MPa, and Charpy impact strengths of 3.7 to 86.3 kJ/m². It was found that Experimental Examples 1 to 21 were excellent in impact strength as well as rigidity.

[2-4] Production of Thermoplastic Resin Composition Using Resin Other than PA11 as Polyamide Resin, and Making of Test Piece Experimental Example 22

Inventive Product

PA610 "Vestamid Terra HS16" (nylon 610 resin, mp=222° C.) manufactured by Daicel-Evonik Ltd. was used as a polyamide resin (A). Anhydrous maleic acid-modified ethylene butene copolymer (modified EBR) "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 12. Subsequently, the mixture was charged into a twin screw kneading extruder (screw diameter=25 mm, L/D=41) manufactured by Parker Corp., Inc., and mixed therein under conditions of a kneading temperature at 235° C., an extrusion speed at 3.0 kg/hr, and the number of screw revolution at 200 rpm. An extruded composition was then cut using a pelletizer so as to prepare a mixed resin pellet of polyamide resin (A) and compatibilizer (C).

The resulting mixed resin and a polypropylene resin "Novatec MA1B" (homopolymer, Mw=312,000, mp=165° C.) manufactured by Japan Polypropylene Corp. as a polyolefin resin (B) were dry-blended so as to have a mixing ratio as listed in Table 12. Subsequently, the mixture was charged into a twin screw kneading extruder (screw diameter=25 mm, L/D=41) manufactured by Parker Corp., Inc., and mixed therein under conditions of a kneading temperature at 235° C., an extrusion speed at 3.0 kg/hr, and the number of screw revolution at 200 rpm. An extruded composition was then cut using a pelletizer so as to prepare a thermoplastic resin composition pellet containing a plant-derived polyamide resin for Experimental Example 22.

After that, the resulting composition pellet for Experimental Example 22 was put into a hopper of an injection molding machine (40-ton injection molding machine) manufactured by Nissei Plastic Ind., Co., Ltd., to prepare a test piece of a thermoplastic resin composition pellet containing a plant-derived polyamide resin for Experimental Example 22 for evaluation under conditions of a set temperature at 235° C. and a mold temperature at 60° C.

Experimental Examples 23 to 27

Inventive Product

Pellets of thermoplastic resin compositions for Experimental Examples 23 to 27 were produced in the same manner as that in Experimental Example 22 except that each pellet was dry-blended so as to have a mixing ratio as listed in Table 12. Then, injection molding was carried out in the same manner as that in Experimental Example 22 to prepare test pieces for Experimental Examples 23 to 27.

Experimental Example 28

Comparative Product

PA610 "Vestamid Terra HS16" (nylon 610 resin, mp=222° C.) manufactured by Daicel-Evonik Ltd. was used as a polyamide resin (A). A polypropylene resin "Novatec MA1B" (homopolymer, Mw=312,000) manufactured by Japan Polypropylene Corp. as a polyolefin resin (B). Each resin was dry-blended so as to have a mixing ratio as listed in Table 12. Subsequently, the mixture was charged into a twin screw kneading extruder (screw diameter=25 mm, L/D=41) manufactured by Parker Corp., Inc., and mixed therein under conditions of a kneading temperature at 235° C., an extrusion speed at 3.0 kg/hr, and the number of screw revolution at 200 rpm. An extruded thermoplastic resin composition was then cut using a pelletizer so as to prepare a thermoplastic resin composition pellet containing a plant-derived polyamide resin for Experimental Example 28.

After that, the resulting composition pellet for Experimental Example 28 was put into a hopper of an injection molding machine (40-ton injection molding machine) manufactured by Nissei Plastic Ind., Co., Ltd., to prepare a test piece for evaluation under conditions of a set temperature at 235° C. and a mold temperature at 60° C.

Experimental Example 29

Inventive Product

PA1010 "Vestamid Terra DS16" (nylon 1010 resin, mp=206° C.) manufactured by Daicel-Evonik Ltd. was used as a polyamide resin (A). Anhydrous maleic acid-modified ethylene butene copolymer (modified EBR) "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 13. Subsequently, the mixture was charged into a twin screw kneading extruder (screw diameter=25 mm, L/D=41) manufactured by Parker Corp., Inc., and mixed therein under conditions of a kneading temperature at 250° C., an extrusion speed at 3.0 kg/hr, and the number of screw revolution at 200 rpm. An extruded composition was then cut using a pelletizer so as to prepare a mixed resin pellet of polyamide resin (A) and compatibilizer (C).

The resulting mixed resin and a polypropylene resin "Novatec MA1B" (homopolymer, Mw=312,000, mp=165° C.) manufactured by Japan Polypropylene Corp. as a polyolefin resin (B) were dry-blended so as to have a mixing ratio as listed in Table 13. Subsequently, the mixture was charged into a twin screw kneading extruder (screw diameter=25 mm, L/D=41) manufactured by Parker Corp., Inc., and mixed therein under conditions of a kneading temperature at 250° C., an extrusion speed at 3.0 kg/hr, and the number of screw revolution at 200 rpm. An extruded composition was then cut using a pelletizer so as to prepare a thermoplastic resin composition pellet containing a plant-derived polyamide resin for Experimental Example 29.

After that, the resulting composition pellet for Experimental Example 29 was put into a hopper of an injection molding machine (40-ton injection molding machine) manufactured by Nissei Plastic Ind., Co., Ltd., to prepare a test piece of a thermoplastic resin composition pellet containing a plant-derived polyamide resin for Experimental Example 29 for evaluation under conditions of a set temperature at 250° C. and a mold temperature at 60° C.

Experimental Examples 30 to 34

Inventive Product

Pellets of thermoplastic resin compositions for Experimental Examples 30 to 34 were produced in the same manner as that in Experimental Example 29 except that each pellet was dry-blended so as to have a mixing ratio as listed in Table 13. Then, injection molding was carried out in the same manner as that in Experimental Example 29 to prepare test pieces for Experimental Examples 30 to 34.

Experimental Example 35

Comparative Product

PA1010 "Vestamid Terra DS16" (nylon 1010 resin, mp=206° C.) manufactured by Daicel-Evonik Ltd. was used as a polyamide resin (A). A polypropylene resin "Novatec MA1B" (homopolymer, Mw=312,000) manufactured by Japan Polypropylene Corp. as a polyolefin resin (B). Each resin was dry-blended so as to have a mixing ratio as listed in Table 13. Subsequently, the mixture was charged into a twin screw kneading extruder (screw diameter=25 mm, L/D=41) manufactured by Parker Corp., Inc., and mixed therein under conditions of a kneading temperature at 250° C., an extrusion speed at 3.0 kg/hr, and the number of screw revolution at 200 rpm. An extruded thermoplastic resin composition was then cut using a pelletizer so as to prepare a thermoplastic resin composition pellet containing a plant-derived polyamide resin for Experimental Example 35.

After that, the resulting composition pellet for Experimental Example 35 was put into a hopper of an injection molding machine (40-ton injection molding machine) manufactured by Nissei Plastic Ind., Co., Ltd., to prepare a test piece for evaluation under conditions of a set temperature at 250° C. and a mold temperature at 60° C.

Experimental Example 36

Inventive Product

PA10T "Vestamid HT Plus M300" (nylon 10T resin, mp=285° C.) manufactured by Daicel-Evonik Ltd. was used as a polyamide resin (A). Anhydrous maleic acid-modified ethylene butene copolymer (modified EBR) "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 14. Subsequently, the mixture was charged into a twin screw kneading extruder (screw diameter=25 mm, L/D=41) manufactured by Parker Corp., Inc., and mixed therein under conditions of a kneading temperature at 310° C., an extrusion speed at 3.0 kg/hr, and the number of screw revolution at 200 rpm. An extruded composition was then cut using a pelletizer so as to prepare a mixed resin pellet of polyamide resin (A) and compatibilizer (C).

The resulting mixed resin and a polypropylene resin "Novatec MA1B" (homopolymer, Mw=312,000) manufactured by Japan Polypropylene Corp. as a polyolefin resin (B) were dry-blended so as to have a mixing ratio as listed in Table 14. Subsequently, the mixture was charged into a twin screw kneading extruder (screw diameter=25 mm, L/D=41) manufactured by Parker Corp., Inc., and mixed therein under conditions of a kneading temperature at 310° C., an extrusion speed at 3.0 kg/hr, and the number of screw revolution at 200 rpm. An extruded composition was then cut using a pelletizer so as to prepare a thermoplastic resin composition pellet containing a plant-derived polyamide resin for Experimental Example 36.

After that, the resulting composition pellet for Experimental Example 36 was put into a hopper of an injection molding machine (40-ton injection molding machine) manufactured by Nissei Plastic Ind., Co., Ltd., to prepare a test piece of a thermoplastic resin composition pellet containing a plant-derived polyamide resin for Experimental Example 36 for evaluation under conditions of a set temperature at 310° C. and a mold temperature at 90° C.

Experimental Examples 37 and 38

Inventive Product

Pellets of thermoplastic resin compositions for Experimental Examples 37 and 38 were produced in the same manner as that in Experimental Example 36 except that each pellet was dry-blended so as to have a mixing ratio as listed in Table 14. Then, injection molding was carried out in the same manner as that in Experimental Example 36 to prepare test pieces for Experimental Examples 37 and 38.

Experimental Example 39

Comparative Product

PA10T "Vestamid HT Plus M300" (nylon 10T resin, mp=285° C.) manufactured by Daicel-Evonik Ltd. was used as a polyamide resin (A). A polypropylene resin "Novatec MA1B" (homopolymer, Mw=312,000) manufactured by Japan Polypropylene Corp. as a polyolefin resin (B). Each resin was dry-blended so as to have a mixing ratio as listed in Table 14. Subsequently, the mixture was charged into a twin screw kneading extruder (screw diameter=25 mm, L/D=41) manufactured by Parker Corp., Inc., and mixed therein under conditions of a kneading temperature at 310° C., an extrusion speed at 3.0 kg/hr, and the number of screw revolution at 200 rpm. An extruded thermoplastic resin composition was then cut using a pelletizer so as to prepare a thermoplastic resin composition pellet containing a plant-derived polyamide resin for Experimental Example 39.

After that, the resulting thermoplastic resin composition pellet for Experimental Example 39 was put into a hopper of an injection molding machine (40-ton injection molding machine) manufactured by Nissei Plastic Ind., Co., Ltd., to prepare a test piece for evaluation under conditions of a set temperature at 310° C. and a mold temperature at 90° C.

TABLE 12

| | | Experimental Example | | | | | | |
|---|---|---|---|---|---|---|---|---|
| | | 22 | 23 | 24 | 25 | 26 | 27 | 28 |
| Mixing ratio (% by mass) | (A) Polyamide (PA610) | 25 | 25 | 25 | 40 | 55 | 70 | 28 |
| | (B) Polyolefin | 65 | 55 | 45 | 50 | 35 | 20 | 72 |
| | (C) Compatibilizer (Anhydrous maleic acid-modified EBR "Tafmer MH7020") | 10 | 20 | 30 | 10 | 10 | 10 | — |
| Mixing method | (B) was used after mixing (A) and (C) | ○ | ○ | ○ | ○ | ○ | ○ | — |
| | (A) and (B) were mixed | — | — | — | — | — | — | ○ |
| Properties | Charpy impact strength (kJ/m$^2$) | 5.4 | 14 | 40.0 | 8.6 | 9.1 | 8.3 | 2.1 |
| | Flexural modulus (MPa) | 1390 | 930 | 660 | 1370 | 1360 | 1380 | 1730 |
| | Specific gravity | 0.942 | 0.942 | 0.936 | 0.969 | 0.996 | 1.023 | 0.855 |

TABLE 13

| | | Experimental Example | | | | | | |
|---|---|---|---|---|---|---|---|---|
| | | 29 | 30 | 31 | 32 | 33 | 34 | 35 |
| Mixing ratio (% by mass) | (A) Polyamide (PA1010) | 25 | 25 | 25 | 40 | 55 | 70 | 28 |
| | (B) Polyolefin | 65 | 55 | 45 | 50 | 35 | 20 | 72 |
| | (C) Compatibilizer (Anhydrous maleic acid-modified EBR "Tafmer MH7020") | 10 | 20 | 30 | 10 | 10 | 10 | — |
| Mixing method | (B) was used after mixing (A) and (C) | ○ | ○ | ○ | ○ | ○ | ○ | — |
| | (A) and (B) were mixed | — | — | — | — | — | — | ○ |
| Properties | Charpy impact strength (kJ/m$^2$) | 3.0 | 15.4 | 40.0 | 2.1 | 4.8 | 8.1 | 1.1 |
| | Flexural modulus (MPa) | 1230 | 880 | 550 | 1350 | 1340 | 1320 | 1650 |
| | Specific gravity | 0.932 | 0.929 | 0.926 | 0.953 | 0.974 | 0.995 | 0.845 |

TABLE 14

| | | Experimental Example | | | |
|---|---|---|---|---|---|
| | | 36 | 37 | 38 | 39 |
| Mixing ratio (% by mass) | (A) Polyamide (PA10T) | 25 | 45 | 60 | 28 |
| | (B) Polyolefin | 55 | 45 | 30 | 72 |
| | (C) Compatibilizer (Anhydrous maleic acid-modified EBR "Tafmer MH7020") | 20 | 10 | 10 | — |
| Mixing method | (B) was used after mixing (A) and (C) | ○ | ○ | ○ | ○ |
| Properties | (A) and (B) were mixed | — | — | — | — |
| | Charpy impact strength (kJ/m$^2$) | 5.0 | 2.1 | 3.8 | 1.1 |
| | Flexural modulus (MPa) | 910 | 1590 | 1620 | 1860 |
| | Specific gravity | 0.944 | 0.987 | 1.017 | 0.860 |

[2-5] Evaluation of Thermoplastic Resin Composition (II)

Experimental Examples 22 to 39

Test pieces for evaluation obtained in Experimental Examples 22 to 39 of the above section [2-4] were subjected to measurement for Charpy impact strength and flexural modulus according to the same method as the above section [2-2]. Results thereof were shown in Tables 12 to 14.

[2-6] Effects

According to the results in Table 12, Experimental Examples 28 in which PA610 was used as the polyamide and the compatibilizer was not used had flexural modulus of 1,730 MPa, but Charpy impact strength was as low as 2.1 kJ/m$^2$.

On the other hand, Experimental Examples 22 to 27 in which PA610 was used as the polyamide and the modified elastomer was used as the compatibilizer had flexural moduli of 660 to 1,390 MPa, and Charpy impact strengths of 5.4 to 40.0 kJ/m$^2$. It was found that Experimental Examples 22 to 27 were excellent in impact strength as well as rigidity.

According to the results in Table 13, Experimental Examples 35 in which PA1010 was used as the polyamide and the compatibilizer was not used had flexural modulus of 1,650 MPa, but Charpy impact strength was as low as 1.1 kJ/m$^2$.

On the other hand, Experimental Examples 29 to 34 in which PA1010 was used as the polyamide and the modified elastomer was used as the compatibilizer had flexural moduli of 550 to 1,350 MPa, and Charpy impact strengths of 2.1 to 40.0 kJ/m$^2$. It was found that Experimental Examples 29 to 34 were excellent in impact strength as well as rigidity.

According to the results in Table 14, Experimental Examples 39 in which PA10T was used as the polyamide and the compatibilizer was not used had flexural modulus of 1,860 MPa, but Charpy impact strength was as low as 1.1 kJ/m$^2$.

On the other hand, Experimental Examples 36 to 38 in which PA10T was used as the polyamide and the modified elastomer was used as the compatibilizer had flexural moduli of 910 to 1,620 MPa, and Charpy impact strengths of 2.1 to 5.0 kJ/m². It was found that Experimental Examples 36 to 38 were excellent in impact strength as well as rigidity.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The invention claimed is:

1. A thermoplastic resin composition, in which a polyamide resin is dispersed in a polyolefin resin, which does not comprise a reactive group that reacts with the polyamide resin, wherein
   the thermoplastic resin composition is obtained by molten blending the polyolefin resin and a mixed resin, which is obtained by molten blending the polyamide resin and an elastomer comprising a reactive group that reacts with the polyamide resin,
   the elastomer is a styrene-based thermoplastic elastomer, or an olefin-based thermoplastic elastomer consisting of a copolymer of an α-olefin having 3 to 8 carbon atoms and ethylene or propylene,
   the content of the polyolefin resin is from 10% to 75% by mass based on 100% by mass of the total of the polyamide resin, the polyolefin resin, and the elastomer,
   the content of the polyamide resin is from 10% to 50% by mass based on 100% by mass of the total of the polyamide resin, the polyolefin resin, and the elastomer,
   the content of the elastomer is from 15% to 40% by mass based on 100% by mass of the total of the polyamide resin, the polyolefin resin, and the elastomer.

2. The thermoplastic resin composition according to claim 1,
   wherein the elastomer is an olefin-based thermoplastic elastomer selected from the group consisting of an ethylene propylene copolymer (EPR), an ethylene 1-butene copolymer (EBR), an ethylene 1-pentene copolymer, an ethylene 1-octene copolymer (EOR), a propylene 1-butene copolymer (PBR), a propylene 1-pentene copolymer and a propylene 1-octene copolymer (POR), or a styrene-based thermoplastic elastomer selected from the group consisting of: a styrene butadiene styrene terpolymer (SBS), a styrene isoprene styrene terpolymer (SIS), a styrene ethylene/butylene styrene tetrapolymer (SEBS), and a styrene ethylene/propylene styrene tetrapolymer (SEPS).

3. The thermoplastic resin composition according to claim 1,
   wherein the polyamide resin is at least one resin selected from the group consisting of polyamide 11, polyamide 6, polyamide 66, polyamide 610, polyamide 612, polyamide 614, polyamide 12, polyamide 6T, polyamide 6I, polyamide 9T, polyamide 1010, polyamide 1012, polyamide 10T, polyamide MXD6, polyamide 6T/66, polyamide 6T/6I, polyamide 6T/6I/66, and polyamide 6T/2M-5T.

4. The thermoplastic resin composition according to claim 1,
   wherein the elastomer is an anhydrous maleic acid-modified ethylene propylene copolymer, an anhydrous maleic acid-modified ethylene 1-butene copolymer, an anhydrous maleic acid-modified styrene ethylene/butylene styrene tetrapolymer, or an anhydrous maleic acid-modified ethylene octene copolymer.

5. A molded article comprising said thermoplastic resin composition according to claim 1,
   wherein the molded article is an exterior material, interior material, or structural material for automobiles, rail vehicles, ships, airplanes, buildings or furniture, or a housing or a structural member of a home appliance.

6. The thermoplastic resin composition according to claim 1,
   wherein the Charpy impact strength of the resin composition on hardening is from 3.0 to 86.3 kJ/m².

7. The thermoplastic resin composition of claim 6, wherein the Charpy impact strength of the hardened resin composition is from 10.1 to 86.3 kJ/m².

8. The thermoplastic resin composition of claim 6, wherein the Charpy impact strength of the hardened resin composition is from 17.9 to 86.3 kJ/m².

9. The thermoplastic resin composition of claim 1, wherein the content of the elastomer is from 20% to 40% by mass.

10. A method of producing a thermoplastic resin composition in which a polyamide resin is dispersed in a polyolefin resin that does not comprise a reactive group that reacts with the polyamide resin, the method comprising:
    molten blending the polyolefin resin and a mixed resin obtained by molten blending a polyamide resin and a compatibilizer, wherein
    the compatibilizer is an elastomer comprising a reactive group that reacts with the polyamide resin
    the elastomer is a styrene-based thermoplastic elastomer, or an olefin-based thermoplastic elastomer consisting of a copolymer of an α-olefin having 3 to 8 carbon atoms and ethylene or propylene,
    the content of the polyolefin resin is from 10% to 75% by mass based on 100% by mass of the total of the polyamide resin, the polyolefin resin, and the compatibilizer,
    the content of the polyamide resin is from 10% to 50% by mass based on 100% by mass of the total of the polyamide resin, the polyolefin resin, and the compatibilizer,
    the content of the compatibilizer is from 15% to 40% by mass based on 100% by mass of the total of the polyamide resin, the polyolefin resin, and the compatibilizer.

11. The method of producing the thermoplastic resin composition according to claim 10,
    wherein the elastomer is an olefin-based thermoplastic elastomer selected from the group consisting of: an ethylene propylene copolymer (EPR), an ethylene 1-butene copolymer (EBR), an ethylene 1-pentene copolymer, an ethylene 1-octene copolymer (EOR), a propylene 1-butene copolymer (PBR), a propylene 1-pentene copolymer and a propylene 1-octene copolymer (POR), or a styrene-based thermoplastic elastomer selected from the group consisting of: a styrene butadiene styrene terpolymer (SBS), a styrene isoprene styrene terpolymer (SIS), a styrene ethylene/butylene styrene tetrapolymer (SEBS), and a styrene ethylene/propylene styrene tetrapolymer (SEPS).

12. The method of producing the thermoplastic resin composition according to claim 10,
   wherein the compatibilizer is an anhydrous maleic acid-modified ethylene propylene copolymer, an anhydrous maleic acid-modified ethylene 1-butene copolymer, an anhydrous maleic acid-modified styrene ethylene/butylene styrene tetrapolymer, or an anhydrous maleic acid-modified ethylene octene copolymer.

13. A thermoplastic resin composition, in which a polyamide resin is dispersed in a polyolefin resin, which does not comprise a reactive group that reacts with the polyamide resin, and wherein
   the thermoplastic resin composition is obtained by molten blending the polyolefin resin and a mixed resin, which is obtained by molten blending the polyamide resin and an elastomer comprising a reactive group that reacts with the polyamide resin,
   the elastomer is a styrene-based thermoplastic elastomer, or an olefin-based thermoplastic elastomer consisting of a copolymer of an α-olefin having 3 to 8 carbon atoms and ethylene or propylene,
   the content of the polyolefin resin is from 10% to 80% by mass based on 100% by mass of the total of the polyamide resin, the polyolefin resin, and the elastomer,
   the content of the polyamide resin is from 10% to 80% by mass based on 100% by mass of the total of the polyamide resin, the polyolefin resin, and the elastomer,
   the content of the elastomer is from 5% to 40% by mass based on 100% by mass of the total of the polyamide resin, the polyolefin resin, and the elastomer, and
   wherein the Charpy impact strength of the resin composition on hardening is from 17.9 to 86.3 kJ/m$^2$.

* * * * *